US011776032B2

(12) United States Patent
Marchant et al.

(10) Patent No.: US 11,776,032 B2
(45) Date of Patent: *Oct. 3, 2023

(54) CUSTOMER SERVICE TOOL

(71) Applicant: Target Brands, Inc., Minneapolis, MN (US)

(72) Inventors: Julie Marchant, Minneapolis, MN (US); Hemachandra Patnaik Urlam, Bengaluru (IN); Vijaya Bhatk, Bengaluru (IN); Eric Montag, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/328,589

(22) Filed: May 24, 2021

(65) Prior Publication Data

US 2021/0279782 A1   Sep. 9, 2021

Related U.S. Application Data

(63) Continuation of application No. 16/599,997, filed on Oct. 11, 2019, now Pat. No. 11,042,918.

(51) Int. Cl.
*G06Q 30/06* (2023.01)
*G06Q 30/0601* (2023.01)
*G06Q 30/01* (2023.01)

(52) U.S. Cl.
CPC ......... *G06Q 30/0613* (2013.01); *G06Q 30/01* (2013.01); *G06Q 30/0633* (2013.01)

(58) Field of Classification Search
CPC . G06Q 30/0613; G06Q 30/0633; G06Q 30/01
(Continued)

(56) References Cited

U.S. PATENT DOCUMENTS 6,850,917 B1 *   2/2005   Hom ...................... G06Q 30/06
                                                                  705/18
6,876,977 B1     4/2005   Marks
                          (Continued)

FOREIGN PATENT DOCUMENTS

WO      WO-0068859 A2 *   11/2000   ......... G06Q 10/0631
WO      WO-2008094522 A2 *   8/2008   ......... G06F 3/04812

OTHER PUBLICATIONS

"Tracking Referral Program Activity through Customer Relationship Management Software with NextBee: Salesforce, NetSuite, Microsoft Dynamics—Quality Leads Increase When Your CRM System Works Seamlessly with Your Referral Program"; PR Newswire [New York] Jan. 7, 2014; retrieved from Dialog 11182023 (Year: 2014).*

(Continued)

*Primary Examiner* — Yogesh C Garg
(74) *Attorney, Agent, or Firm* — Merchant & Gould P.C.

(57) ABSTRACT

The present disclosure is directed to a system and method for quickly and efficiently resolving customer service issues associated with online shopping. When a customer requiring assistance contacts a customer service agent, the agent may use the customer's identification information to search for the customer's account. After locating the customer's active shopping cart or the customer account, the agent may open a session to view and edit the customer's shopping cart information, order information or account information. The agent may use the one or more administrative options available to the agent and unavailable to the customer to make changes to the customer account as needed. After making changes to the customer account, the agent may direct the customer to refresh their customer account in order to get updated with the changes made by the agent, thus resolving the customer's issues quickly and efficiently.

20 Claims, 21 Drawing Sheets

(58) Field of Classification Search
USPC ...................................................... 705/26.41
See application file for complete search history.

(56) References Cited

U.S. PATENT DOCUMENTS

| | | | |
|---|---|---|---|
| 7,949,572 B2 | 5/2011 | Perrochon et al. | |
| 8,775,514 B2* | 7/2014 | Goel .................. | G10L 15/22 |
| | | | 379/265.09 |
| 9,718,558 B2 | 8/2017 | Ball et al. | |
| 10,127,590 B2 | 11/2018 | Bawge et al. | |
| 10,127,600 B2 | 11/2018 | Kumar et al. | |
| 10,645,171 B1* | 5/2020 | Baker .................. | H04L 65/80 |
| 10,963,946 B2* | 3/2021 | Houbart ............. | G06Q 30/0641 |
| 2003/0101116 A1 | 5/2003 | Rosko et al. | |
| 2004/0068443 A1* | 4/2004 | Hopson ................ | G06Q 10/08 |
| | | | 705/5 |
| 2007/0050295 A1* | 3/2007 | Kilby .................... | G06Q 30/02 |
| | | | 705/51 |
| 2007/0239552 A1 | 10/2007 | Sundaresan | |
| 2007/0271147 A1 | 11/2007 | Crespo et al. | |
| 2009/0172565 A1* | 7/2009 | Jackson .................. | H04L 67/10 |
| | | | 715/753 |
| 2009/0182643 A1 | 7/2009 | Holstein et al. | |
| 2012/0185355 A1 | 7/2012 | Kilroy | |
| 2012/0203661 A1 | 8/2012 | Baharloo et al. | |
| 2012/0265567 A1* | 10/2012 | Muszynski ............ | G06Q 10/10 |
| | | | 705/7.11 |
| 2014/0101609 A1 | 4/2014 | Bamford et al. | |
| 2014/0195370 A1 | 7/2014 | Devasia et al. | |
| 2014/0279280 A1* | 9/2014 | Bennett ................ | G06Q 20/401 |
| | | | 705/26.82 |
| 2015/0039381 A1* | 2/2015 | Coronel ............... | G06Q 30/016 |
| | | | 705/7.27 |
| 2015/0052016 A1* | 2/2015 | Truitt .................. | G06Q 30/0617 |
| | | | 705/26.43 |
| 2016/0171578 A1 | 6/2016 | Bawge et al. | |
| 2016/0210006 A1* | 7/2016 | Bányai .................... | H04L 67/10 |
| 2021/0117948 A1* | 4/2021 | Voss ........................ | G06N 3/08 |

OTHER PUBLICATIONS

Article, Avon accelerates digital transformation plans to become fast-beauty brand PR Newswire Asia [New York] Jun. 27, 2018; extracted from Google on Oct. 17, 2021.

* cited by examiner

| CUSTOMER ACCOUNT INFORMATION DATABASE 410 | | | | | | | |
|---|---|---|---|---|---|---|---|
| USER ID 420 | NAME 430 | E-MAIL 440 | ADDRESS 450 | | SHOPPING CART INFORMATION 460 | ORDER INFORMATION 470 | PAYMENT INFORMATION 480 |
| | | | SHIPPING 452 | BILLING 454 | | | |
| | | | | | | | |
| | | | | | | | |
| | | | | | | | |

| SHOPPING CART INFORMATION DATABASE 510 |||
|---|---|---|
| CUSTOMER INFORMATION 520:<br>    USER ID<br>    E-MAIL ADDRESS<br>    ADDRESS<br>    CART NUMBER |||
| ITEMS 530 | QUANTITY 540 | PRICE 550 |
|  |  |  |
|  |  |  |
|  |  |  |
|  |  |  |
| SUBTOTAL: 560 ||  |
| DELIVERY FEE: 562 ||  |
| ESTIMATED TAX: 564 ||  |
| DISCOUNT: 566 ||  |
| TOTAL PRICE: 568 ||  |

FIG. 5

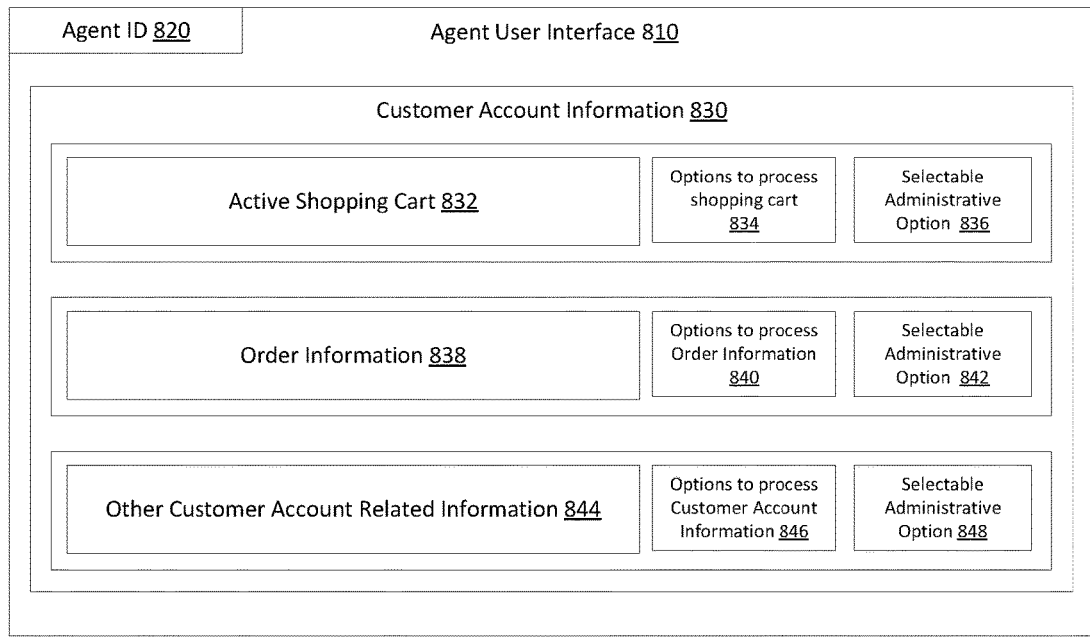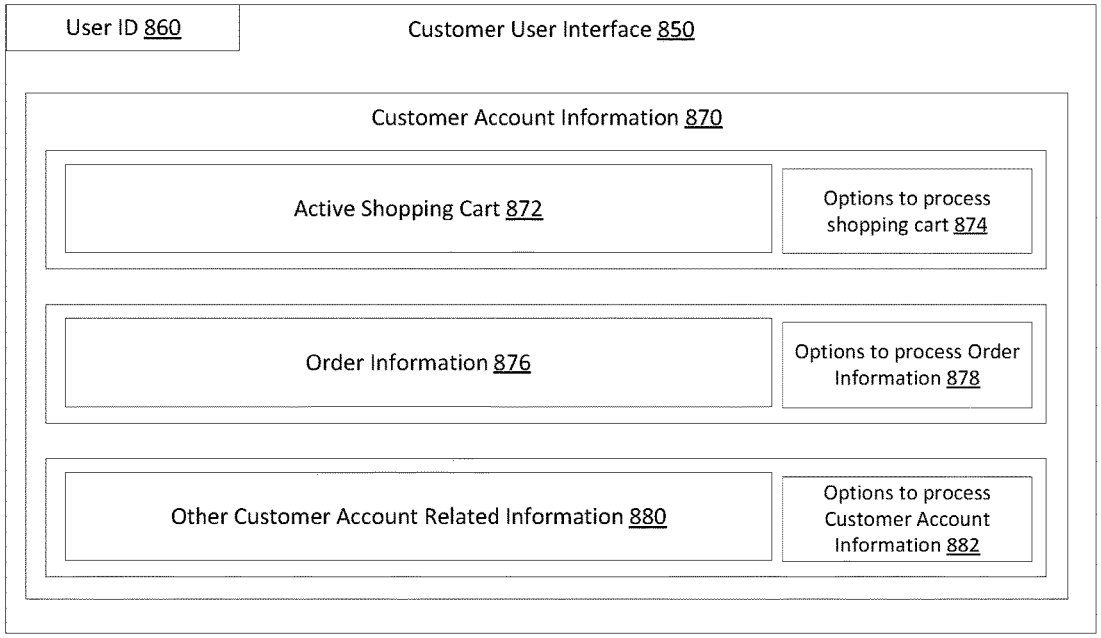
FIG. 8

| assisting: Mickey Mouse | 2 in cart | |
|---|---|---|
| categories ˅  🔍 search | | |
| Shopping cart | | order summary |
| | | subtotal (1 item)  $265.99 |
| Igloo Marine 94 Quart Cooler  ⊖ 1 ⊕ qty  $62.98 | | discounts  -$26.60 |
| | clearance | save 10% on select home items with code MOMSDAY |
| remove  save for later | reg $125.99 | |
| gift options | BOGOCOA9 | delivery  free |
| ● shipping | | handling fee  $30.00 |
| get it by 5/12 with REDcard | | tax  not yet calculated |
| ○ free ship to store | | |
| get it in 4-7 days at Lake Street | | total  $269.39 |
| find at another store | | |
| $50.00 Gift Card | free | cart number: 103160516853 |
| offer codes | | |
| promo or team member code | | |
| SAVE10 | | |
| apply | | |

CUSTOMER SERVICE TOOL

CROSS-REFERENCE TO RELATED APPLICATION

This application is a continuation of U.S. patent application Ser. No. 16/599,997, filed Oct. 11, 2019. The disclosure of this priority application is hereby incorporated by reference in its entirety into the present application.

BACKGROUND

In the past, customers predominantly shopped in person at retail stores for items. With the advent of the World Wide Web, more and more customers use the internet to shop online because of its convenience. Typically, the process of online shopping involves many steps including: searching and locating items on a retailer's website, adding the items to a virtual shopping cart and following a virtual checkout process including providing payment and shipment information.

In some instances, customers may encounter issues with the process of online shopping and may require assistance from a customer service agent. Customers may communicate with the customer service agent through the telephone or online messaging. However, both platforms are ineffective in clearly conveying the issue at hand, because typically the customer must describe, in words, the issue being experienced.

In helping resolve an issue, the customer service agent may try to recreate it based on the customer's description, but may not always succeed in doing so. Not being able to clearly visualize and understand the customer's issues leads to confusion and ineffective customer service assistance.

SUMMARY

Generally, the present disclosure relates to a system and method for providing efficient customer service assistance to customers shopping online.

In one example aspect, a system for assisting customers who request customer service help is disclosed. The system includes: a computing system comprising including a processor; a memory communicatively connected to the processor, the memory storing program instructions including a customer service tool, the program instructions being executable by the processor to cause the computing system to: receive validation information of a customer service agent; receive identification data associated with a customer; responsive to receiving the identification data and validation of the customer service agent, generate a user interface presentable at a remote customer service agent device, the user interface including: a first graphical representation of an active shopping cart of the customer, the active shopping cart being associated with the identification data, and the first graphical representation having an appearance corresponding to a customer view of the active shopping cart; and at least one administrative option selectable by the customer service agent to execute a function affecting the active shopping cart of the customer, wherein the at least one administrative option is unavailable to the customer.

In a second aspect, a system for assisting customers who request customer service help is disclosed. The system includes: a computing system comprising: a processor; a memory communicatively connected to the processor which stores program instructions executable by the processor, wherein, when executed the program instructions cause the system to: receive identification data associated with a customer; responsive to receiving the identification data, generate a user interface presentable at a remote customer service agent device, the user interface including: a customer account interface including customer account information, wherein the customer account information is associated with the identification data, the customer account interface having an appearance corresponding to a customer view of the customer account information; and at least one administrative option selectable by a customer service agent to execute a function affecting the customer account information, wherein the at least one administrative option is unavailable to the customer.

In a third aspect, a method for assisting customers who request customer service help is disclosed. The method includes: prompting a customer service agent to input credentials, wherein the credentials correspond to the identity of the customer service agent; in response to a positive verification of the credentials, prompting the customer service agent to enter identification data associated with a customer; receiving the identification data associated with the customer from the customer service agent; in response to receiving the identification data, providing a user interface to the customer service agent, the user interface including: a customer account interface including customer account information, wherein the customer account information is associated with the identification data, the customer account interface having an appearance corresponding to a customer view of the customer account information; and at least one administrative option selectable by a customer service agent to execute a function modifying the customer account information, wherein the at least one administrative option is unavailable to the customer.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 4 illustrates an example customer account information data store.

FIG. 5 illustrates an example shopping cart information data store.

FIG. 8 illustrates an embodiment of the agent user interface.

FIG. 17 illustrates an embodiment of the order details page.

FIG. 18 illustrates an embodiment of the customer service tool showing the customer service agent assisting the customer in adding a discount code.

FIG. 19 illustrates an embodiment of the customer account page showing the customer service agent adding a concession to the customer's active shopping cart.

DETAILED DESCRIPTION

Figure 1:
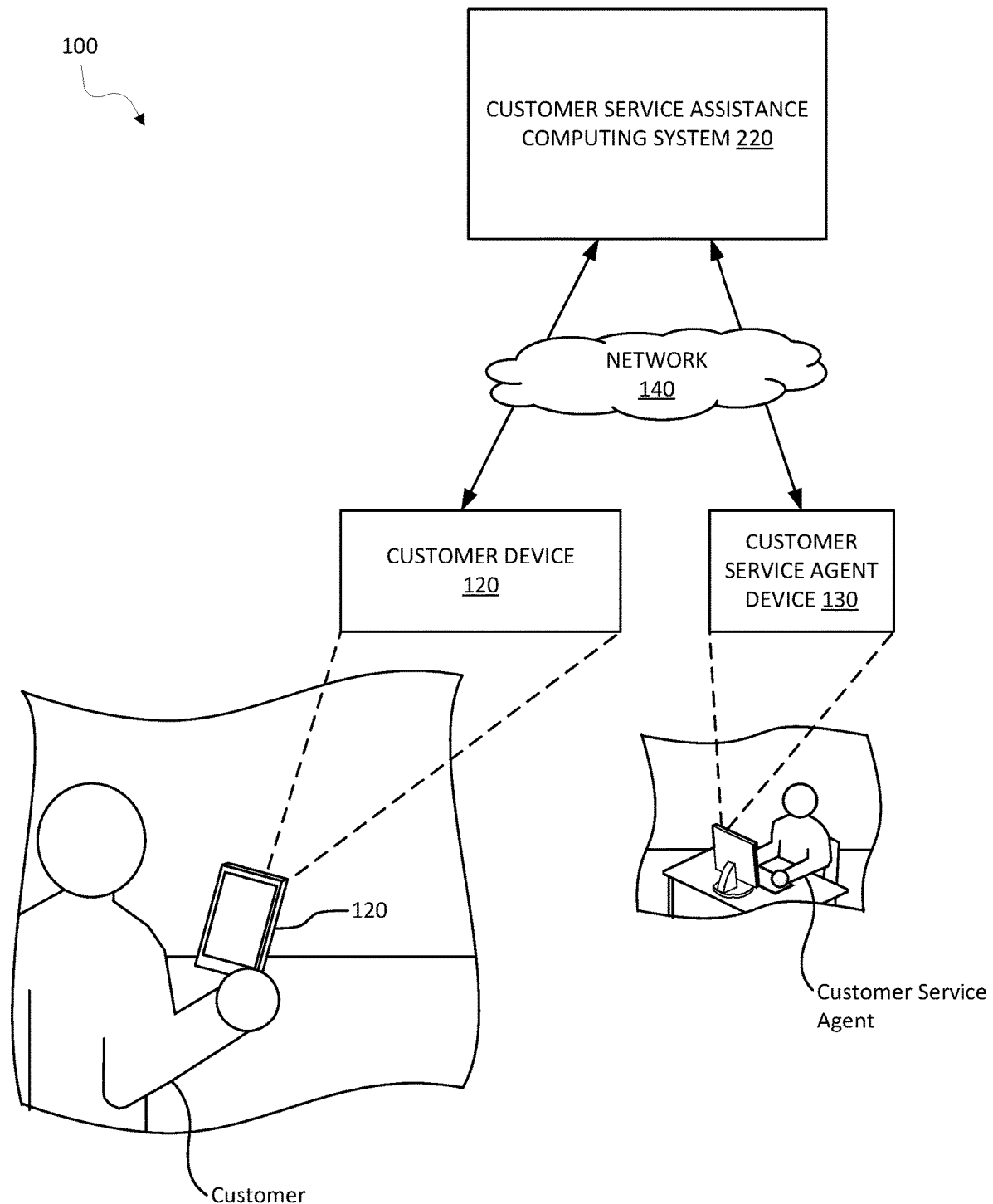
FIG. 1 illustrates an example of the customer service assistance system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the subject matter of this disclosure is a tool that assists customer service agents in resolving customer service issues associated with online shopping. With the customer service tool herein disclosed, customer service agents can experience what the guest is experiencing. The customer service tool operates by permitting the customer service agent to access the customer's shopping cart and account information, and editing the contents in ways that the customer may not be permitted. This enables the agents to resolve the customer's issues quickly and efficiently, as well as to directly adjust aspects of the customer account if needed.

In example aspects, the present disclosure is directed to a system and method for quickly and efficiently resolving customer service issues associated with online shopping. When a customer conducting online shopping runs into an issue, the customer may contact the customer service agent to get the issue resolved. The customer service agent may utilize the customer service tool herein disclosed to resolve the customer's issues. Initially, the customer service agent logs into the customer service tool with his/her credentials. Based on the agent's credentials, the agent's user interface is customized for the agent. When a customer contacts the agent requiring assistance, the customer service agent may use an identifier of the customer (e.g., a customer ID number, name, email address, etc.) to search for the customer's profile or customer account. After locating the customer account, the agent may open a session to view the customer's account information, including the customer's active shopping cart and order history. The customer service tool gives the customer service agent the ability to edit the customer's account information, shopping cart information, or order information in real-time. The agent also has the ability to use one or more administrative options available to the agent and unavailable to the customer to make changes to the customer account as needed. Once the customer service agent has completed making changes to the customer's account, the agent may direct the customer to refresh their customer account in order to see his/her account as being updated with the changes made by the agent.

FIG. 1 illustrates an example customer service assistance system 100 including a customer service assistance computing system 220, a customer device 120 and a customer service agent device 130, both communicatively connected to the computing device 200 through a network 140. A customer operates the customer device 120 and a customer service agent operates the customer service agent device 130.

In example embodiments, the customer device 120 and customer service agent device 130 can take a variety of forms. For example, the customer device 120 may be any type of mobile or desktop computing system, and may present to a user his/her account, shopping cart, or order information in a web browser window or within a mobile application. The customer service agent device 130 may similarly be a variety of types of devices; in some examples, the customer service agent device 130 may be a trusted computing terminal dedicated to accessing customer order data (e.g., a WYSE or Citrix-based terminal). In alternative embodiments, the customer service agent device 130 may be any desktop or mobile device that is not dedicated to accessing customer order data; in such examples, the device 130 may be limited in terms of the types of customer data that may be accessed (e.g., non-sensitive financial data such as non-PCI data).

Figure 2:
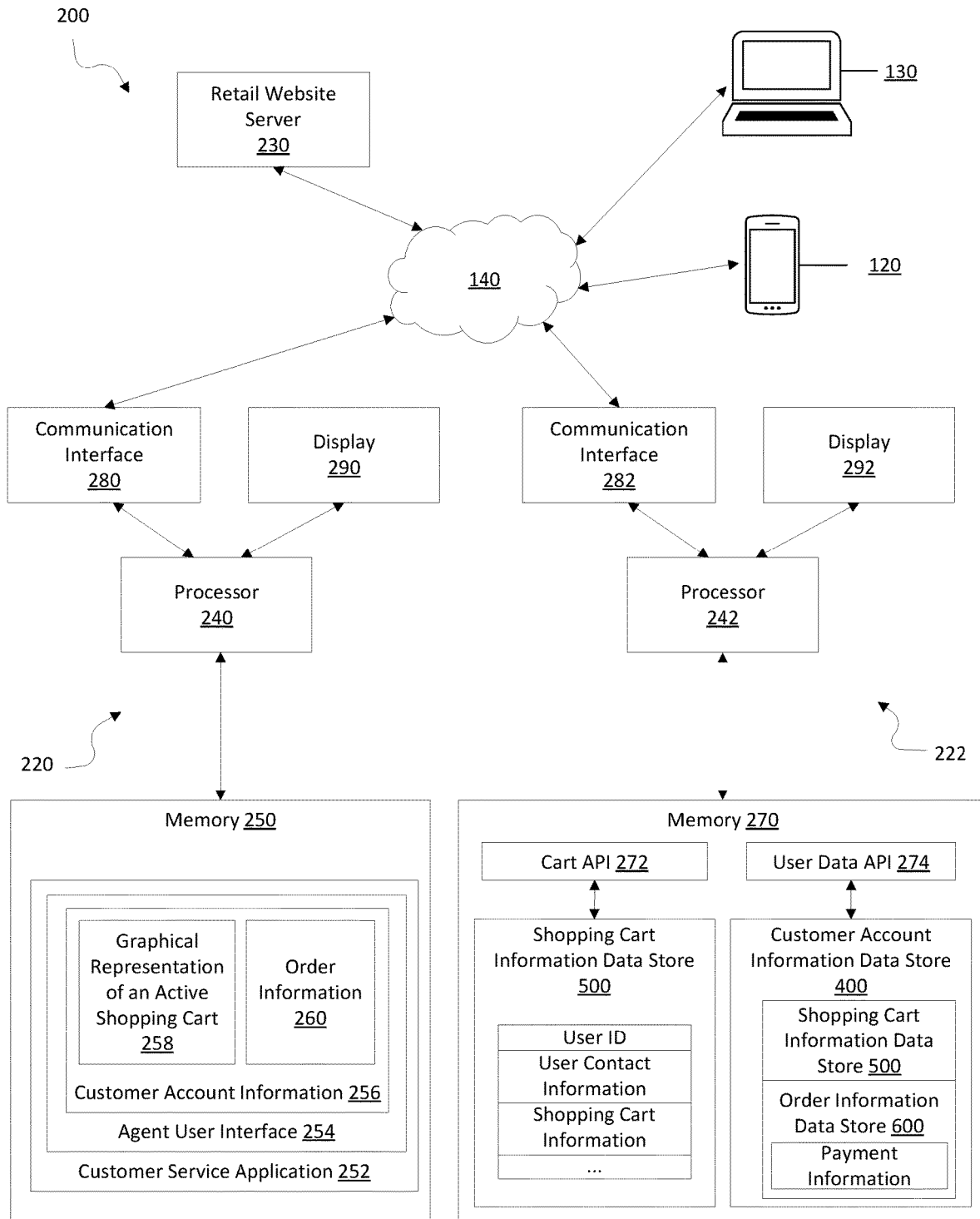
FIG. 2 illustrates another example of the customer service assistance system.

FIG. 2 illustrates a specific illustration of a customer service assistance system 200. The system 200 represents one possible version of the customer service assistance system 100 of FIG. 1, including details regarding tools used to assist a customer service agent in accessing customer account, order, or cart data for purposes of facilitating customer assistance.

In the embodiment shown, the customer service assistance system 200 includes a customer service assistance computing system 220 and a customer data store computing system 222, both communicatively connected to a retail website server 230, a customer device 120 and a customer service agent device 130 via network 140 (e.g., the Internet). The retail web server 230 presents items to a customer device 120 and a customer service agent device 130, which display such items to the customer and the customer service agent via either a browser or application. A user may select one or more items for purchase, and those items are then associated with the user account of that user.

The customer service assistance computing device 220 includes a processor 240 communicatively connected to a memory 250 via a data bus. The customer data store computing system 222 also includes a processor 242 communicatively connected to a memory 270 via a data bus. It is noted that, in some embodiments, the customer data store computing system 222 may be located remotely from the customer service assistance computing system 220, so long as it is accessible to the customer service assistance computing system 220.

The processor 240 and 242, respectively, can be any of a variety of types of programmable circuits capable of executing computer-readable instruction to perform various tasks, such as mathematical and communication tasks. The memory 250 and 270, respectively, can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components.

The customer service assistance computing device 220 and customer data store computing system 222 include communication interfaces 280 and 282, respectively configured to receive and transmit data. In one example, the customer service assistance computing system 220 may access data in an external data store, such as through the customer data store computing system 222. Display 290 is connected to processor 240 and can be used to view any underlying data that exists within memory 250 associated with the customer assistance computing system 220. Display 292 is connected to processor 242 and can be used to view any underlying data that exists within memory 270 associated with the customer data store computing system 222.

In the embodiment shown, the memory 270 associated with the customer data store computing system 222 stores, and exposes, a cart API 272 and a user data API 274. In general, an API, or Application Programming Interface is a set of functions or procedures that enables a program or application to gain access to underlying data. In some embodiments, memory 270 also includes the shopping cart information data store 500 and a customer account information data store 400. In other embodiments the shopping cart information data store 500 and the customer account information data store 400 may not be located within the same computing system but rather in different computing systems that are connected remotely.

The cart API 272 controls access to the shopping cart information data store 500, for example, for access by the customer service assistance computing device 220 or customer device 120. The user data API 274 controls access to the customer account information data store 400, for example, for access by the customer service assistance computing device 220 or customer device 120. Accordingly, the same data may be accessed by both a customer and a customer service representative.

In various embodiments, the customer account information data store 400 includes data regarding the customer's account and is described in further detail as related to FIG. 4. In addition to other customer account information, the customer account information data store 400 also includes a shopping cart information data store 500 and order information data store 600. The order information data store 600 can include PCI information such as credit card or debit card information. In various embodiments, the shopping cart information data store 500 includes data regarding the customer's shopping cart items and is described in further detail as related to FIG. 5.

In the embodiment shown, the memory 250 associated with the customer service assistance computing system 220 stores a customer service application 252. In various embodiments, the customer service application 252 includes an agent user interface 254. In general, the customer service application 252 receives customer identification data entered by the customer service agent. Responsive to receiving the customer identification data, the customer service application 252 generates an agent user interface 254 presentable at a remote customer service agent device 130. The agent user interface 254 displays customer account information 256 that is associated with the customer identification data entered by the customer service agent. The customer account information 256 includes a graphical representation of an active shopping cart of the customer 258 and order information 260.

In various embodiments, the customer account information 256 is generated based on data derived from the customer account information data store 400, which can be accessed through the user data API 274. The graphical representation of an active shopping cart 258, which is displayed on the agent user interface 254 as part of the customer account information 256, is generated based on data derived from the shopping cart information data store 500, which can be accessed through the cart API 272. The order information 260, which is displayed on the agent user interface 254 as part of the customer account information 256, is generated based on data derived from the order information data store 600, which can also be accessed through the user data API 274.

It is noted that in some example embodiments, the user data API 274 may provide access control to certain types of user data. Any sensitive or otherwise private data related to a customer account is only accessible by customer service agents with the proper access rights. For example, only a customer service agent supervisor may have permission to access or view a customer's credit card information that is included in the order information data store 600. Or, only a customer service agent using a trusted terminal (e.g., a computing device having a higher level of security, or being positioned within an enterprise, or otherwise having stronger access controls to ensure security of customer data) may access such sensitive customer data, while a comparatively lower-security computing terminal (e.g., a remote access terminal or other type of customer service agent computing system) may still be provided with the ability to view a customer's shopping cart and selected customer account or order information, but certain types of data may be excluded from that view that may otherwise be included (e.g., credit card or other data, including, for example, PCI data).

Figure 3:
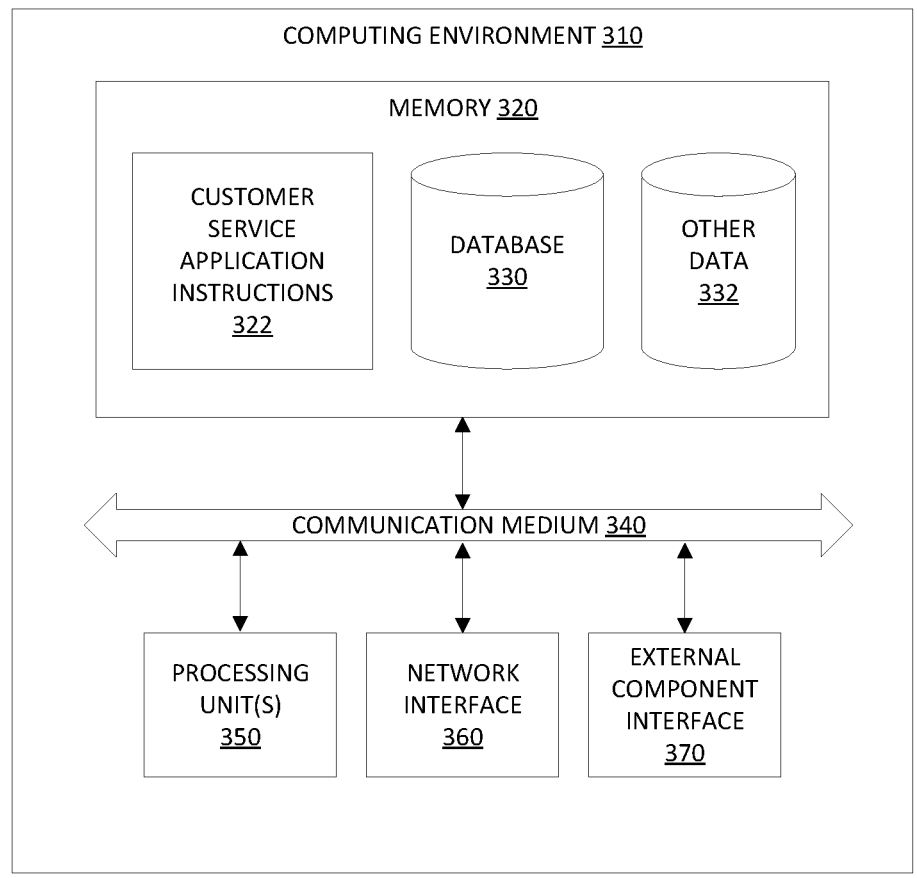
FIG. 3 illustrates an example computing system.

FIG. 3 illustrates an example computing system 300 with which disclosed systems and methods can be used. In an example, the computing system 300 can include a computing environment 310. The computing environment 310 can be a physical computing environment, a virtualized computing environment, or a combination thereof, and useable as any of the computing systems described above in connection with FIG. 1. The computing environment 310 can include memory 320, a communication medium 340, one or more processing units 350, a network interface 360, and an external component interface 370.

The memory 320 can include a computer readable storage medium. The computer storage medium can be a device or article of manufacture that stores data and/or computer-executable instructions. The memory 320 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 320 can store various types of data and software. For example, as illustrated, the memory 320 includes instructions 322 for implementing one or more aspects of the customer service assistance system described herein, for example, the customer service application 252, as well as database 330 and other data 332. In some examples, the memory 320 can include customer account information data store 400, the shopping cart information data store 500 and/or order information data store 600, or instructions for accessing such data.

The communication medium 340 can facilitate communication among the components of the computing environment 310. In an example, the communication medium 340 can facilitate communication among the memory 320, the one or more processing units 350, the network interface 360, and the external component interface 370. The communications medium 340 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 350 can include physical or virtual units that selectively execute software instructions. In an example, the one or more processing units 350 can be physical products comprising one or more integrated circuits. The one or more processing units 350 can be implemented as one or more processing cores. In another example, one or more processing units 350 are implemented as one or more separate microprocessors. In yet another example embodiment, the one or more processing units 350 can include an application-specific integrated circuit (ASIC) that provides specific functionality. In yet another example, the one or more processing units 350 provide specific functionality by using an ASIC and by executing computer-executable instructions.

The network interface 360 enables the computing environment 310 to send and receive data from a communication network (e.g., network 16). The network interface 360 can be implemented as an Ethernet interface, a token-ring network interface, a fiber optic network interface, a wireless network interface (e.g., WI-FI), or another type of network interface.

The external component interface 370 enables the computing environment 310 to communicate with external devices. For example, the external component interface 370 can be a USB interface, Thunderbolt interface, a Lightning interface, a serial port interface, a parallel port interface, a PS/2 interface, and/or another type of interface that enables the computing environment 310 to communicate with external devices. In various embodiments, the external component interface 370 enables the computing environment 310 to communicate with various external components, such as external storage devices, input devices, speakers, modems, media player docks, other computing devices, scanners, digital cameras, and fingerprint readers.

Although illustrated as being components of a single computing environment 310, the components of the computing environment 310 can be spread across multiple computing environments 310. For example, one or more of instructions or data stored on the memory 320 may be stored partially or entirely in a separate computing environment 310 that is accessed over a network.

FIG. 4 illustrates an example customer account information data store 400. One example of the customer account information data store 400 includes a customer account information database 410. The customer account information data store 400 may also include other storage methods. The customer account information database 410 stores a plurality of customer entries. Each customer entry is associated with a particular customer account and describes different aspects of that particular customer account. A non-limiting list of aspects for each customer entry includes: user identification information or user ID 420, name 430, email address 440, address 450, shopping cart information 460, order information 470 and payment information 480. The name 430 may include both the first and last names of the customer. The address 450 includes both the customer's shipping address 452 and the customer's billing address 454. The shopping cart information 460 may link to the shopping cart information data store 500 and may retrieve data as necessary. The order information 470 may link to the order information data store 600 and may retrieve data as necessary. The payment information 480 may include one or more of the customer's credit card, debit card or other method of payment information. Other aspects of a customer account may also be included for each customer entry under the customer account information database 410.

FIG. 5 illustrates an example shopping cart information data store 500. The shopping cart information data store 500 stores data associated with a customer's virtual shopping cart. One example of the shopping cart information data store 500 includes a shopping cart information database 510. The shopping cart information data store 500 may also include other storage methods. The shopping cart information database 510 stores a plurality of item entries. Each item entry is associated with a particular shopping item and describes different aspects of that particular shopping item. A non-limiting list of aspects for each shopping item includes: customer information 520, items 530, quantity 540, price 550, subtotal 560, delivery fee 562, estimated tax 564, discount 566, and total price 568. The customer information 520 includes identification information regarding the customer account associated with the shopping cart. This customer information 520 may include: user ID, email address, address and cart number among other customer account related information. The items 530 lists each shopping item by name or item ID number. The quantity 540 lists the number of each shopping item the customer wishes to purchase. The price 550 lists the price per item of item 530 multiplied by the quantity 540 of items. The subtotal 560 is sum of the prices 550 from all the item entries listed under the shopping cart information database 510. The delivery fee 562 is an additional fee for delivery of item to customer's address and is based on the customer's shipping address 452. The estimated tax 564 includes an estimate of the total tax amount charged for the plurality of items stored in the shopping cart information data store 500. The discount 566 includes the total amount in reductions in price for the plurality of items in the shopping cart information data store 500. The discount amount may depend on the underlying coupon, concession, clearance, promotion, etc. The total price 568 is the sum of the subtotal, delivery fee, estimated tax reduced by the discount and represents the total price the customer needs to pay to own and receive the shopping items in the shopping cart. Other aspects of a customer shopping cart may also be included for each shopping item entry under the shopping cart information database 510.

Figure 6:
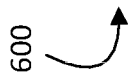
FIG. 6 illustrates and example order information data store.

FIG. 6 illustrates an example order information data store 600. The order information data store 600 stores data associated with a customer's historical orders. One example of the order information data store 600 includes order information database 610. The order information data store 600 may also include other storage methods. The order information database 610 stores a plurality of order entries. Each order entry is associated with a particular order placed in the past by the customer and describes different aspects of that particular order. A non-limiting list of aspects for each order includes: order number 620, date of purchase 630, order status 640, shipping status 650, payment information 660 and order shipping address 670. The order number 620 lists the identification number associated with the particular order. The date of purchase 630 lists the date on which the order was completed. The order status 640 lists the status of the order including, but not limited to: order completed, cancelled and returned. The shipping status 650 lists the shipping status as the order including, but not limited to: awaiting shipment, shipped, delayed, and delivered. The shipping status 650 may also include shipment tracking information including carrier used to ship the order, current location, and estimated date of delivery. The payment information 660 includes details regarding the form of payment used to complete the order purchase. The payment information 660 may include credit card information, debit card information, third-party payment information, gift card information, etc. The order shipping address 670 lists the address to which the order is shipped.

Figure 7:
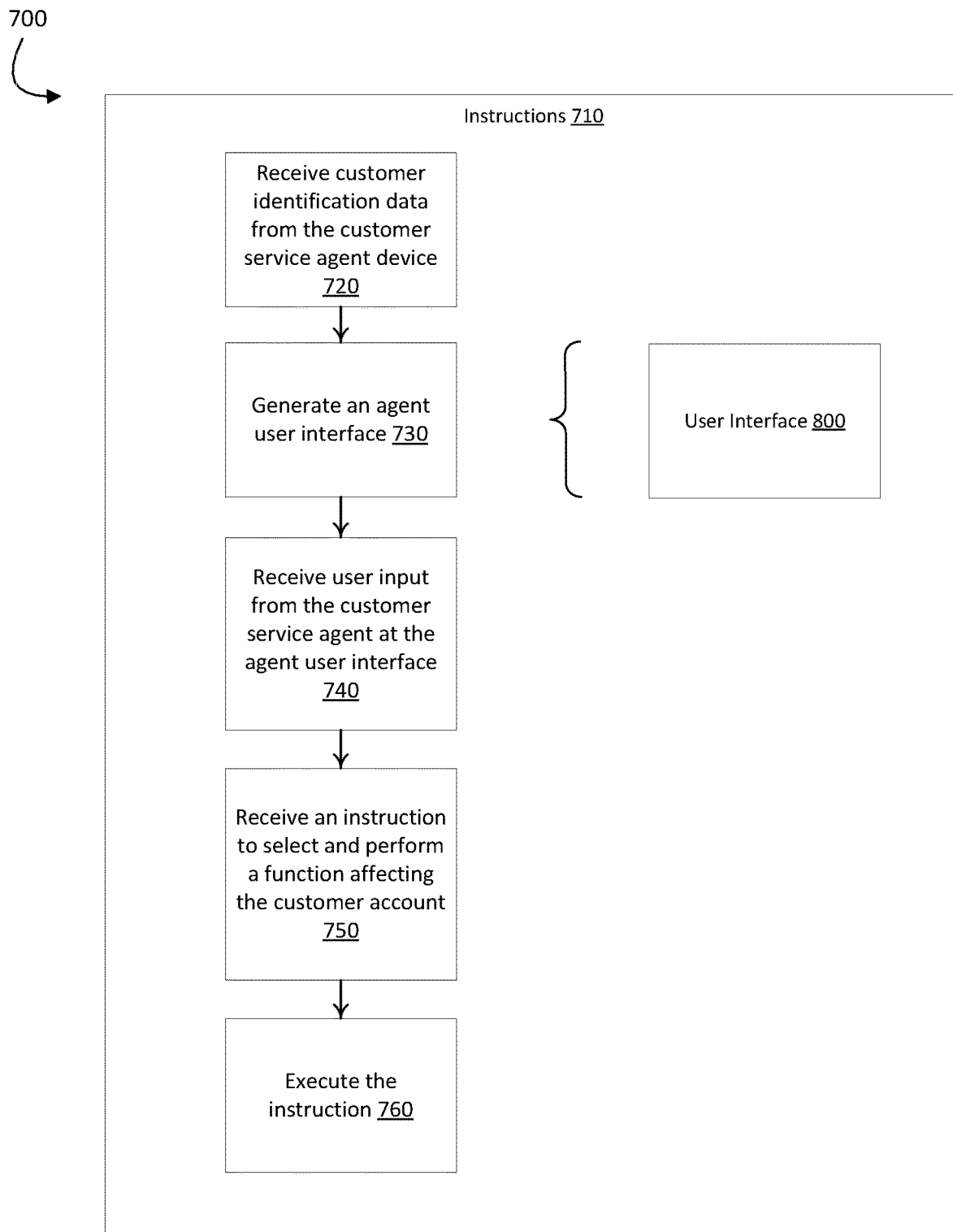
FIG. 7 illustrates a flowchart of an example execution of instructions at the customer service assistance computing system.

FIG. 7 illustrates a flowchart of an example method 700 that may be performed by a customer service assistance computing system. As shown in FIG. 2, the customer service assistance computing system 220 comprises a processor 240, and a memory 250 communicatively connected to the processor, the memory 250 storing program instructions executable by the processor 240. The flowchart depicted in FIG. 7 shows an example execution flow of the program instructions at the customer service assistance computing system 220 and may include the following steps: receive customer identification data from the customer service agent device 720; generate an agent user interface 730; receive user input from the customer service agent at the agent user interface 740; receive an instruction to select and perform a function affecting the customer account 750; and execute the instruction 760.

Initially, the customer service agent may log in to the customer service tool by providing his/her credentials such that the agent user interface 254 is customized based on the identity of the customer service agent. One example of the type of credentials that can be entered into the customer service tool includes the customer service agent's user ID and password. Next, the customer service agent enters the customer identification data associated with a customer on the customer service agent device 130 and the customer service assistance computing system receives the entered customer identification data associated with the customer 720. The customer identification data used to access the customer account include, but are not limited to: cart number, order number, customer email address, customer phone number and customer name.

Responsive to receiving the identification data, the customer service assistance computing system 220 generates an agent user interface 730 presentable to the customer service agent at the customer service agent device 130. The agent user interface 254 presented at the customer service agent device 130 includes access to the customer account information associated with the identification data. The customer account information, among other customer related data, may include user ID 420, name 430, email address 440, shipping and billing address 450, payment information 480. The customer account information also includes active shopping cart information 460 and historical order information 470 of the customer.

It is noted that in certain embodiments, some portions of the customer account information may be obscured or excluded from view from the customer service agent based on the identity and credentials of the customer service agent, or the manner in which customer account information is accessed. One example of customer account customization may include the following: some customer service agents may not be able to view some forms of customer payment information while other agents may be able to view the same. For example, a customer service agent may not be able to view a customer's credit/debit card information, but a supervisor may have access to the same information, or the customer service agent may have access to such information if such access is provided from a trusted computing terminal. Data related to the customer account is stored in the customer account information database 410 and is illustrated in FIG. 4. An example of the agent user interface 254 is described in more detail in conjunction with FIG. 8, below.

The customer service agent then enters instructions, on the agent user interface 800, to be executed by the customer service assistance computing system 220. The customer service assistance computing system 220 receives the user input entered by the customer service agent 740.

Responsive to the user input from the customer service agent 740, the customer service assistance computing system 220 receives instructions to select and perform a function affecting the customer account 750.

Upon receipt of such instructions, the customer service assistance computing system 220 executes the instructions, thereby affecting the customer account 760. The user input from the customer service agent at the customer service agent device 130 includes input associated with the at least one administrative option selectable by the customer service gent to execute a function affecting the customer account, wherein the at least one administrative option is unavailable to the customer. In other words, the customer service agent has access to options that edit the customer account in ways that the customer cannot.

FIG. 8 illustrates an embodiment of the agent user interface 810 as seen by the customer service agent and the customer user interface 850 as seen by the customer. The agent user interface 810 is one example of the agent user interface 254 described above. In the embodiment shown, the customer service agent may initially supply credentials to verify his/her identity as an agent. Based on the identification data supplied by the customer service agent, the agent user interface 810 may be custom generated. The agent's identification or agent ID 820 may be displayed on the agent user interface 810. One or more customer account information 830 belonging to the customer or customers the agent is currently assisting may be displayed within the agent user interface 810. The customer account information 830 may include a graphical representation of the active shopping cart 832, order information 838, and other customer account related information 844.

The active shopping cart 832 may include one or more options to process shopping cart 834 and at least one selectable administrative option 836 that affects the active shopping cart, available to the customer service agent, but otherwise unavailable to the customer. The one or more options to process shopping cart 834 may include: adding an item, editing the number of items, deleting an item, entering a coupon code, and checking out shopping cart. A subset of selectable administrative options 836 available to the customer service agent when accessing a customer's active shopping cart 832 may include, among others: applying discounts, and waiving fees.

The order information 838 may include one or more options to process order information 840, and at least one selectable administrative option 842 that affects the order information, available to the customer service agent, but otherwise unavailable to the customer. The one or more options to process order information 840 may include: checking on order status, reviewing items in the order, checking on shipping status and tracking shipment of order items. A subset of selectable administrative options 842 available to the customer service agent when accessing the customer's order information 838, may include, among others: canceling items from a previously placed order, canceling a previously placed order, editing payment information associated with a previously placed order, editing shipping information associated with a previously placed order, accessing detailed order status information, refunding costs, applying discounts, and waiving fees.

The other customer account related information 844 may include one or more options to process the customer account information 846 and at least one selectable administrative option 848 that affects the customer account, available to the customer service agent, but otherwise unavailable to the customer. The one or more options to process customer account information 846 includes: editing the customer's personal information, adding or editing shipping address, adding or editing payment information, adding or editing gift card information, and adding or editing account settings. A subset of selectable administrative options 848 available to the customer service agent when accessing the customer's account information 844 may include, among others: disabling the customer account.

The customer may supply credentials to verify his/her identity and populate the customer user interface 850 with his/her customer account information 870. The customer's identification or user ID 860 may be displayed on the customer user interface 850. The customer account information 870 includes a graphical representation of the customer's active shopping cart 872, order information 876, and other customer account related information 880. The graphical representation of the customer's active shopping cart 872 may include one or more options to process the active shopping cart 874. The one or more options to process shopping cart 874 may include: adding an item, editing the number of items, deleting an item, entering a coupon code, and checking out shopping cart. The order information 876 may include one or more options to process the order information 878. The one or more options to process order information 878 may include: checking on order status, reviewing items in the order, checking on shipping status and tracking shipment of order items. The other customer account related information 880 may include one or more options to process the customer account information 882. The one or more options to process customer account information 882 includes: editing the customer's personal information, adding or editing shipping address, adding or editing payment information, adding or editing gift card information, and adding or editing account settings.

The graphical representation of the active shopping cart 872 presented in the customer user interface 850 and the graphical representation of the active shopping cart presented in the agent user interface 810 both derive its data from the same shopping cart information data store 500. The customer user interface 850 displays the active shopping cart 872 to the customer where the customer is able to update the shopping cart items by adding, removing or editing the items in the cart. As the active shopping cart is updated, the corresponding data is stored in the shopping cart information data store 500.

In accordance with the user interfaces disclosed in FIG. 8, when the customer requests assistance from a customer service agent regarding one or more aspects of the active shopping cart, the customer service agent is able to input the customer's identification data and the active shopping cart of the customer is presented to the customer service agent through the agent user interface 810. The active shopping cart 832 presented to the agent also derives its underlying data from the same shopping cart information data store 500 as the customer user interface 850. Similarly, the order information 876 presented to the customer through the customer user interface 850 and the order information 838 presented to the customer service agent through the agent user interface 810 both derive its data from the same order information data store 600. And, the other customer account related information 880 presented to the customer through the customer user interface 850 and the other customer account related information 844 presented to the customer service agent through the agent user interface 810 derive its data from the same customer account information data store 400. Accordingly, the customer service agent can view the exact issues encountered by the customer, and can directly access and edit the customer's account information in ways that the customer may not be able to (e.g., making modifications to orders already placed, applying pricing corrections, adding/removing items from a shopping cart, etc.).

Figure 9:
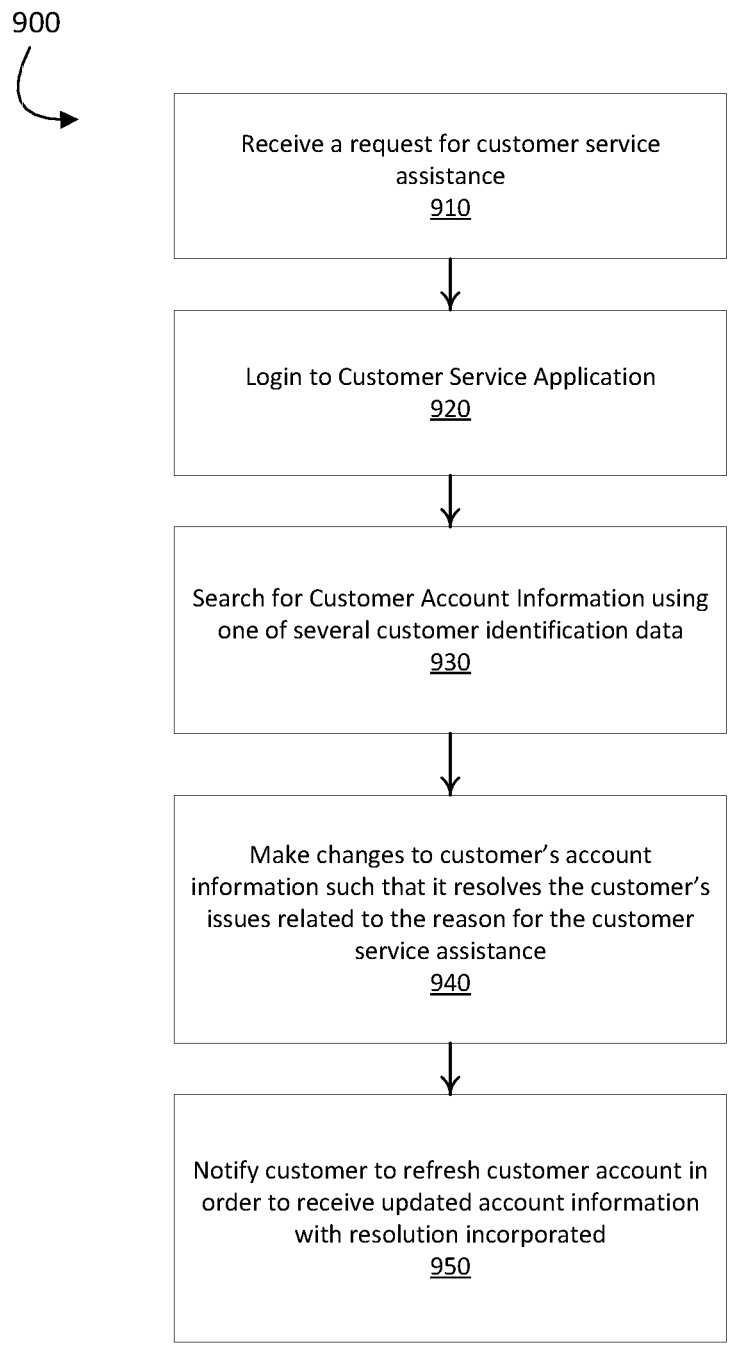
FIG. 9 illustrates an example flowchart showing the steps executed by a customer service agent in assisting a customer.
Figure 10:
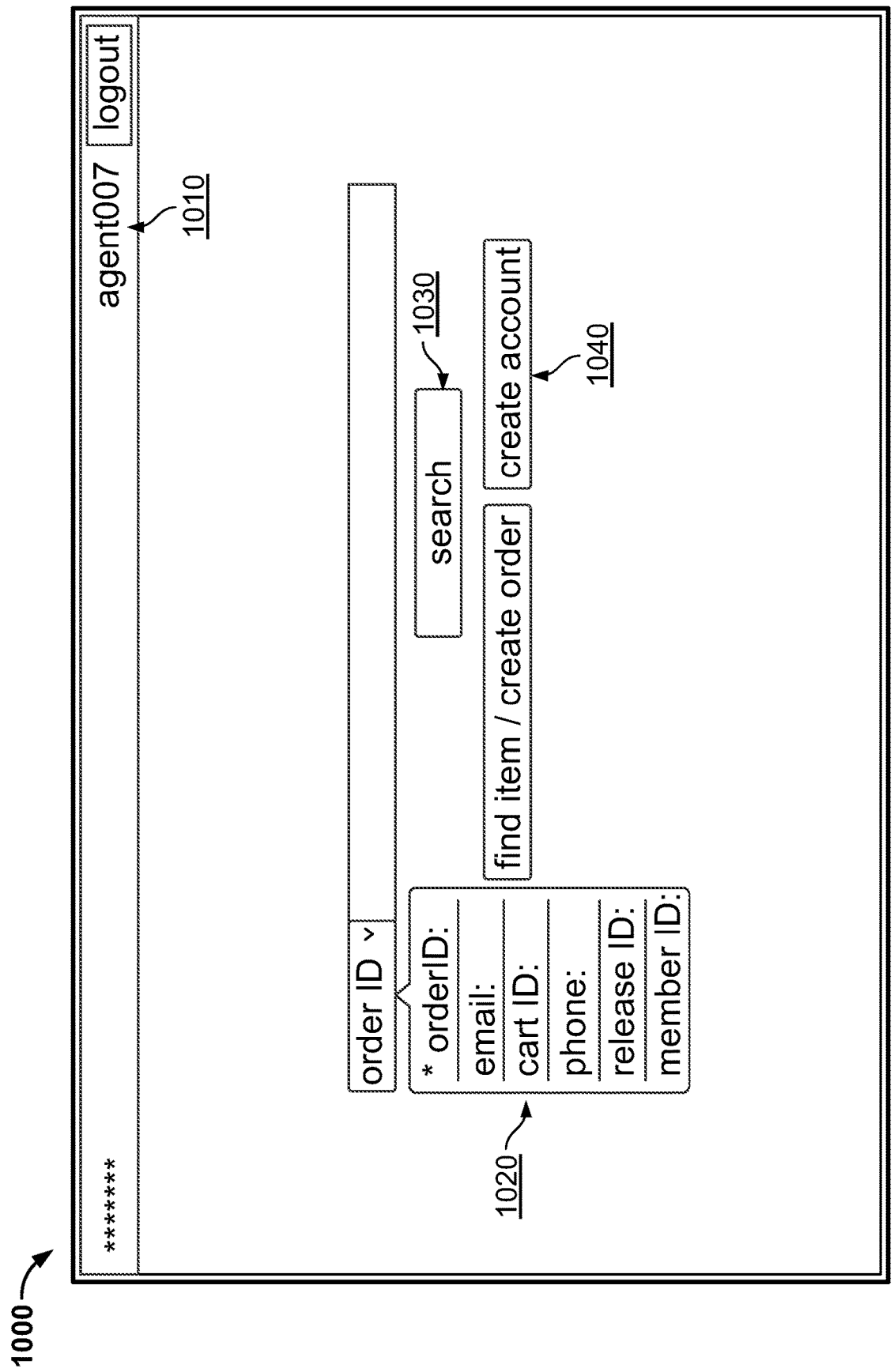
FIGS. 10-13 illustrate various embodiments of the customer search screen on the agent user interface.
Figure 11:
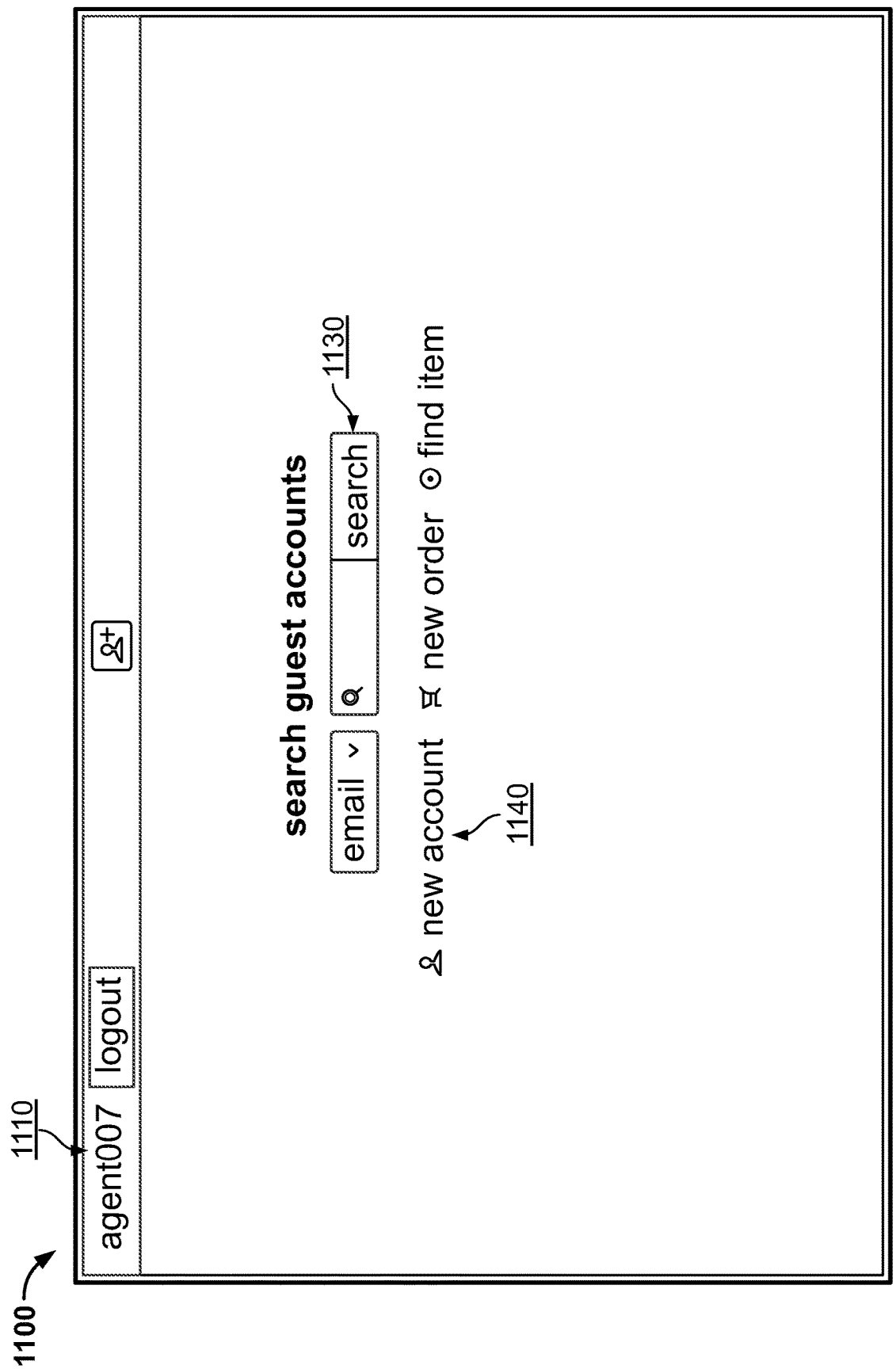
Figure 12:
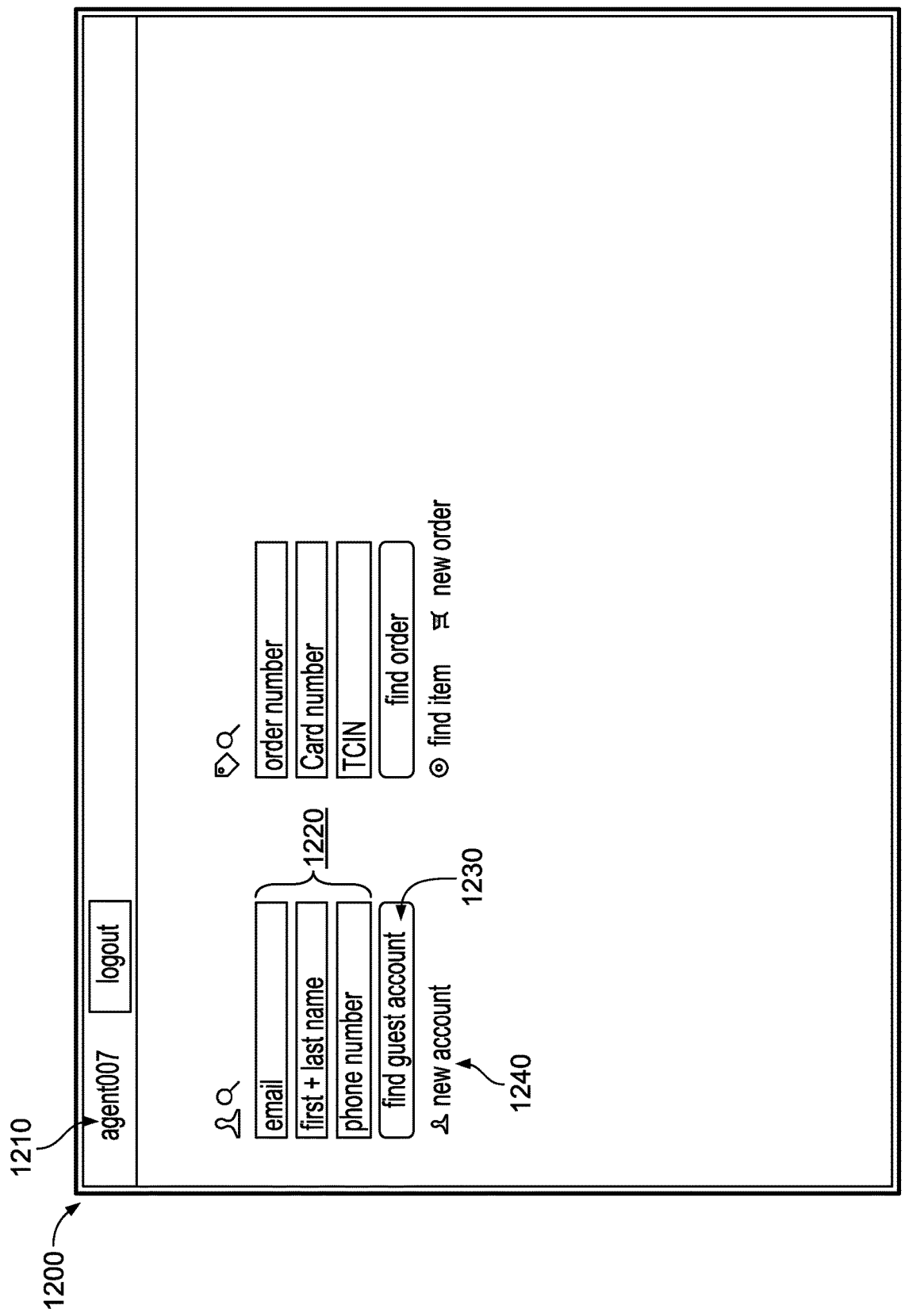
Figure 13:
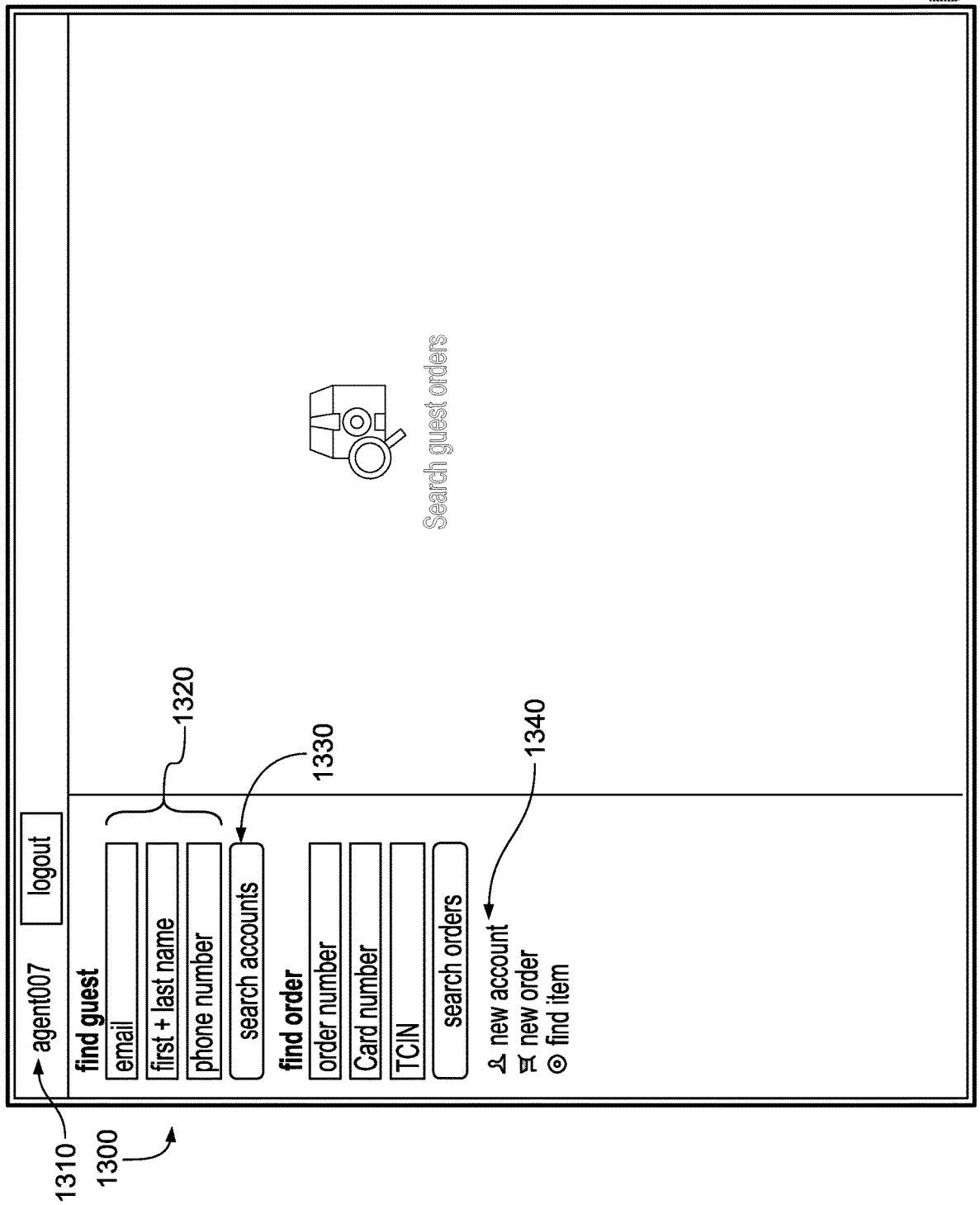

FIG. 9 illustrates a flowchart showing an example set of steps executed by a customer service agent in assisting a customer. The process begins when a customer service agent receives a request for customer service assistance (step 910) from a customer. The customer service agent logs in to the customer service application (step 920) to begin the process of assisting the customer. The customer service application 252 is described in more detail under FIG. 2.

After the customer service agent logs in, the customer service application 252 presents the customer service agent with a screen that allows the customer service agent to search for customer account information using one of several customer identification data (step 930) associated with the customer. The customer identification data may include one of: order ID, cart ID, email address, phone number, name, and user ID. The customer service agent can then navigate the customer account associated with the customer needing assistance. The customer account viewed by the customer service agent is populated using updated data from the exact same data stores as that used to populate the customer account viewed by the customer. Therefore, the data in the customer account is up to date and allows the customer service agent to essentially view what the customer is viewing.

The customer service agent can then make changes to the customer's account information such that it resolves the customer's issues related to the reason for the customer service assistance (step 940). The customer's issues could be related to problems with the customer's active shopping cart, or related to one of the customer's previous orders or related to the customer's account settings. In any case, once the customer service agent gains access to the customer account information, the customer service agent is free to navigate to the appropriate section of the account to make edits in order to best serve the needs of the customer.

Once the customer service agent has completed making changes to the customer account necessary to resolve the customer's issues, the customer service agent may notify the customer to refresh their customer account in order to receive the updated account information with resolution incorporated (step 950). By refreshing their customer accounts, the customer may receive updated customer account information that automatically has the customer service agent's changes incorporated into it, thus resolving any customer issues efficiently.

Referring now to FIGS. 10-21, a series of example detailed user interfaces are provided that illustrate various ways in which a customer service tool may generate an agent user interface that allows a customer service agent to quickly view the status of a customer's account information, identify issues in that account information, and resolve issues by using service options on those user interfaces which are not otherwise available to the customer.

FIG. 10-13 illustrate various embodiments of the customer search screen on the agent user interface 1000, 1100, 1200, 1300. Initially, the customer service agent logs in to the agent user interface 254 using his/her credentials. The customer service agent's credential is displayed on the customer agent user interfaces 1010, 1110, 1210, 1310. Each embodiment has a customer identification menu 1020, 1120, 1220, 1320, which is a selectable and/or fillable list of methods by which the customer can be identified. The customer service agent can select the appropriate field and fill in the corresponding identification information associated with the customer that is currently being assisted. After the menu is appropriately filled out, the customer service agent may be able to click on the search button 1030, 1130, 1230, 1330, in order to search for the customer account information associated with the customer. If the customer does not have a customer account, the customer service agent may still be able to access the customer's active shopping cart information and order information using the cart ID and order ID. In addition, the customer service agent also has the ability to create a new account for customers who do not already have a customer account by clicking on the "create account" or "new account" button 1040, 1140, 1240, 1340. In some embodiments, the customer service agent may also have the ability to create a new order or create a new active shopping cart for customers who do not already have one. If a customer who does not have a customer account requests help with an active shopping cart, the customer can supply the customer service agent with the cart ID associated with the shopping cart. The customer service agent may then be able to access the cart information directly without having to access the customer account information. The customer service agent may then make changes to the cart such that it resolves the customer's issues. Once the issues are resolved, the customer service agent may direct the customer to refresh the active shopping cart, which causes the active shopping cart to incorporate the changes made by the customer service agent. The same method can be used to resolve issues with orders placed by customers lacking a customer account.

Figure 14:
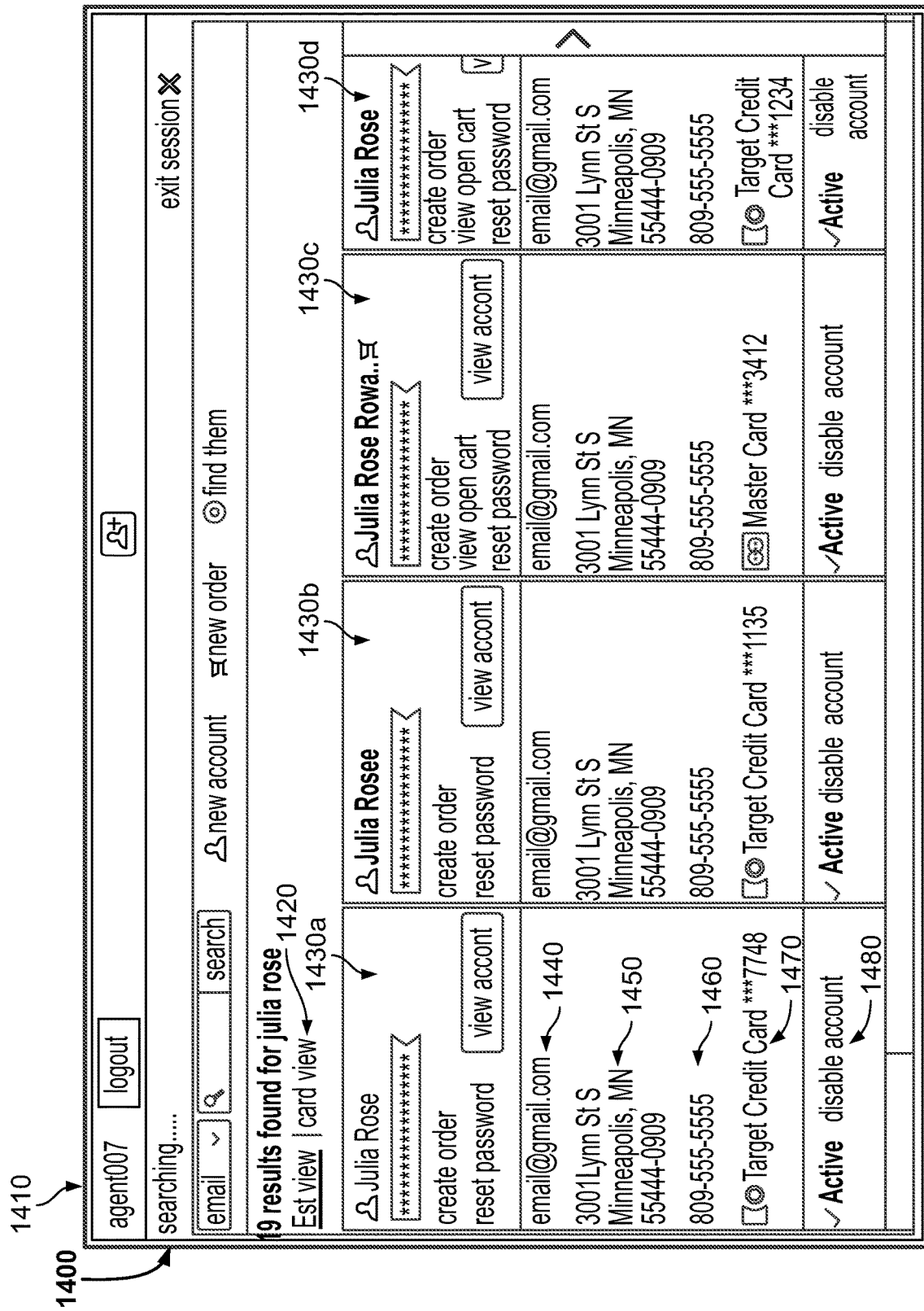
FIG. 14 illustrates an example of a search results page.

FIG. 14 illustrates an embodiment of a search results page when the customer service agent searches for a customer using a name as the customer identification data 1400. The customer service agent's credential is displayed on the customer agent user interfaces 1410. Unlike other customer identification data, searching for a customer account using only the customer's name may yield in multiple results matching the search query. When multiple search results are yielded from the search, all yielded results are listed on agent's user interface for the agent to select the account that best matches his/her query. The search results can be presented in a "list view" or a "card view". 1420 shows the option where the customer service agent can toggle between the two views. FIG. 14 shows one embodiment of a "card view" where the search results are listed in a columnar fashion. Each "card" 1430a, 1430b, 1430c, 1430d depicts a customer account that closely matches the queried first last and last names. The customer information displayed under each "card" may include the customer's email address 1440, the customer's address 140, the customer's phone number 1460, customer's payment information 1470 and customer's account status. The customer service agent may use the customer information displayed under each "card" to identify and select the customer account that best matches the customer that the agent is currently helping. The customer service agent may also have the ability to disable a customer account by clicking on a "disable account" option on the agent user interface.

Figure 15:
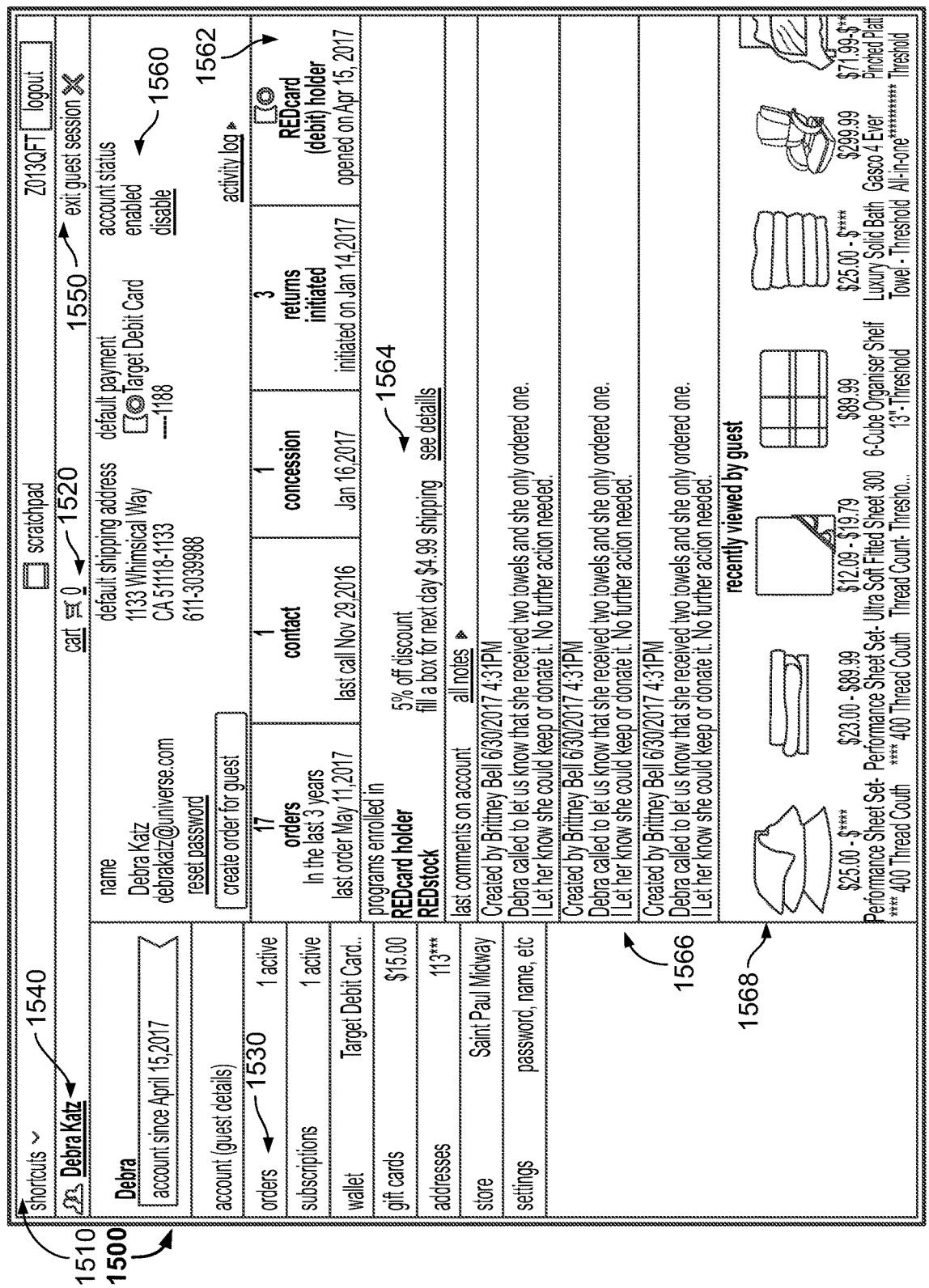
FIG. 15 illustrate an embodiment of the "agent view" of the customer account as displayed on the agent user interface.

FIG. 15 illustrate an embodiment of the "agent view" of the customer account as displayed on the agent user interface 1500. The credentials 1510 of the customer service agent who is currently logged into the agent user interface 254 is displayed on the agent user interface 254. Within the agent user interface 254, the customer service agent has the capability to have one or more customer sessions open concurrently. Each customer session corresponds to each of the customers that the customer the agent is currently helping. In the example embodiment illustrated in FIG. 15, only one customer session is open within the agent user interface 254. The customer session displays the customer account details including: active cart information 1520, order details 1530, and other aspects of the customer account like: subscriptions, payment information, gift card information, address information, retail store information and account settings. Each of these customer account details are links that lead to more details when clicked. The customer name 1540 associated with the customer account is displayed on the customer account page for easy identification. The customer service agent may also exit out of a customer session by clicking on the "exit guest session" or "exit customer session" 1550 button on the customer account page.

In the example shown, the customer account page also includes: customer details 1560, account summary 1562, program enrollment summary 1564, comments/notes 1566 and recent activity summary 1568. The customer details 1560 include a brief list of personal information associated with the customer including: customer name, email address, address, payment information and status of account. The account summary 1562 includes: number of orders placed in a given period, number of contacts with customer service agents, number of concessions or discounts given to the customer, number of returns made in a given period, and if the customer holds a retailer credit or debit card. The program enrollment summary 1564 includes information on the programs that the customer is enrolled in, including any loyalty program, any membership discounts, any subscription discounts. The comments/notes 1566 section includes any comments or notes that customer service agents have written regarding their interaction with the customer. The recent activity summary 1568 keeps track of the customer's viewing history.

Figure 16:
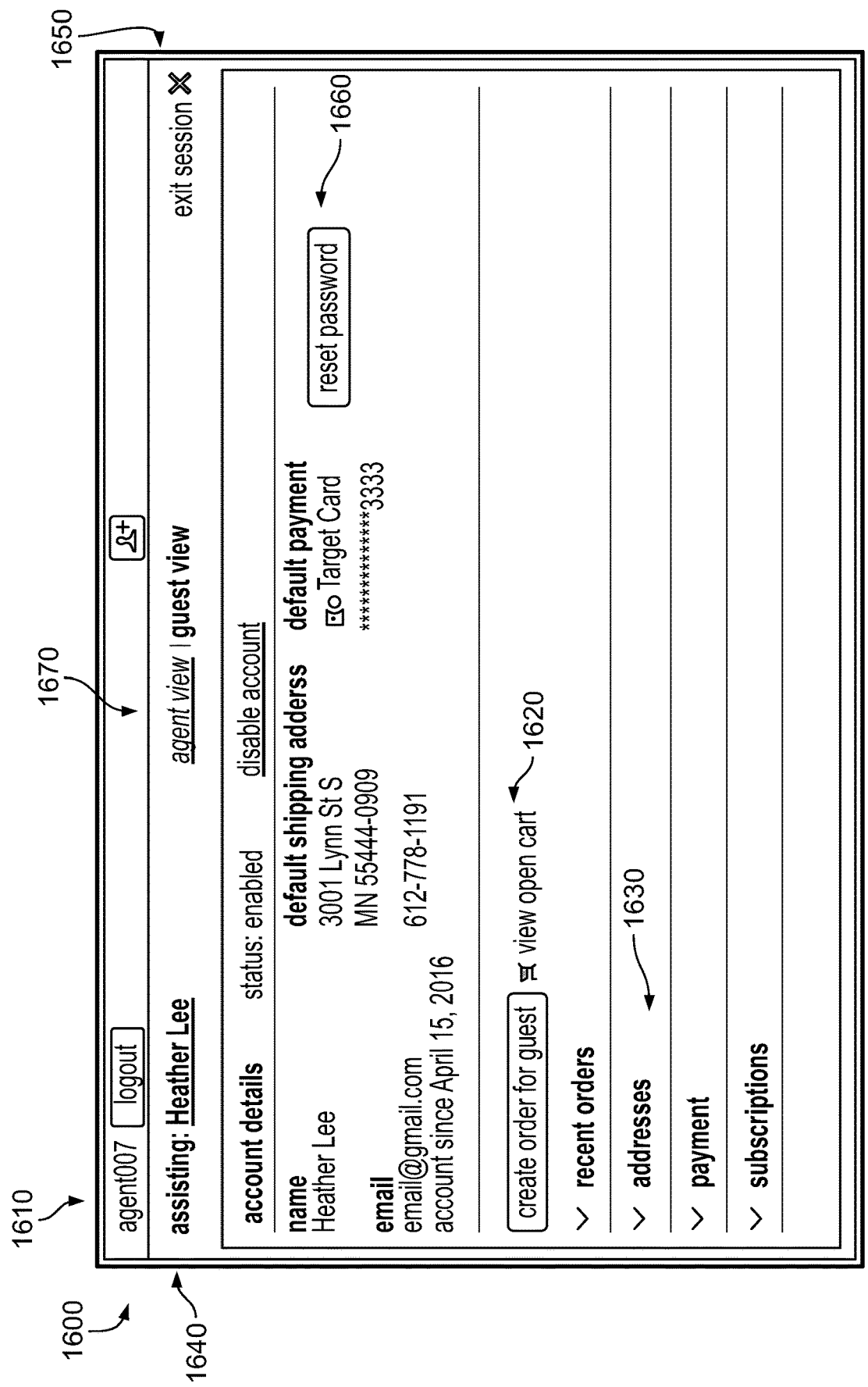
FIG. 16 illustrates an embodiment of the "guest view" of the customer account as displayed on the agent user interface.

FIG. 16 illustrates an embodiment of the "guest view" of the customer account as displayed on the agent user interface 1600. The "guest view" customer account page includes some of the same features as the "agent view" customer account page described in FIG. 15, including: agent credentials 1610, active cart information 1620, order details 1630, customer name 1650, session exit button 1650 and customer details 1660. However, other features such as account summary, program enrollment summary, comments/notes and recent activity summary are absent from the "guest view" as such features are only available for customer service agents as part of their roles in assisting customers. Customer service agents have the option to toggle between the "agent view" and the "guest view" using a toggle button 1670 that is included within the agent user interface. This allows customer service agents to see what the customer is seeing.

Figure 17:
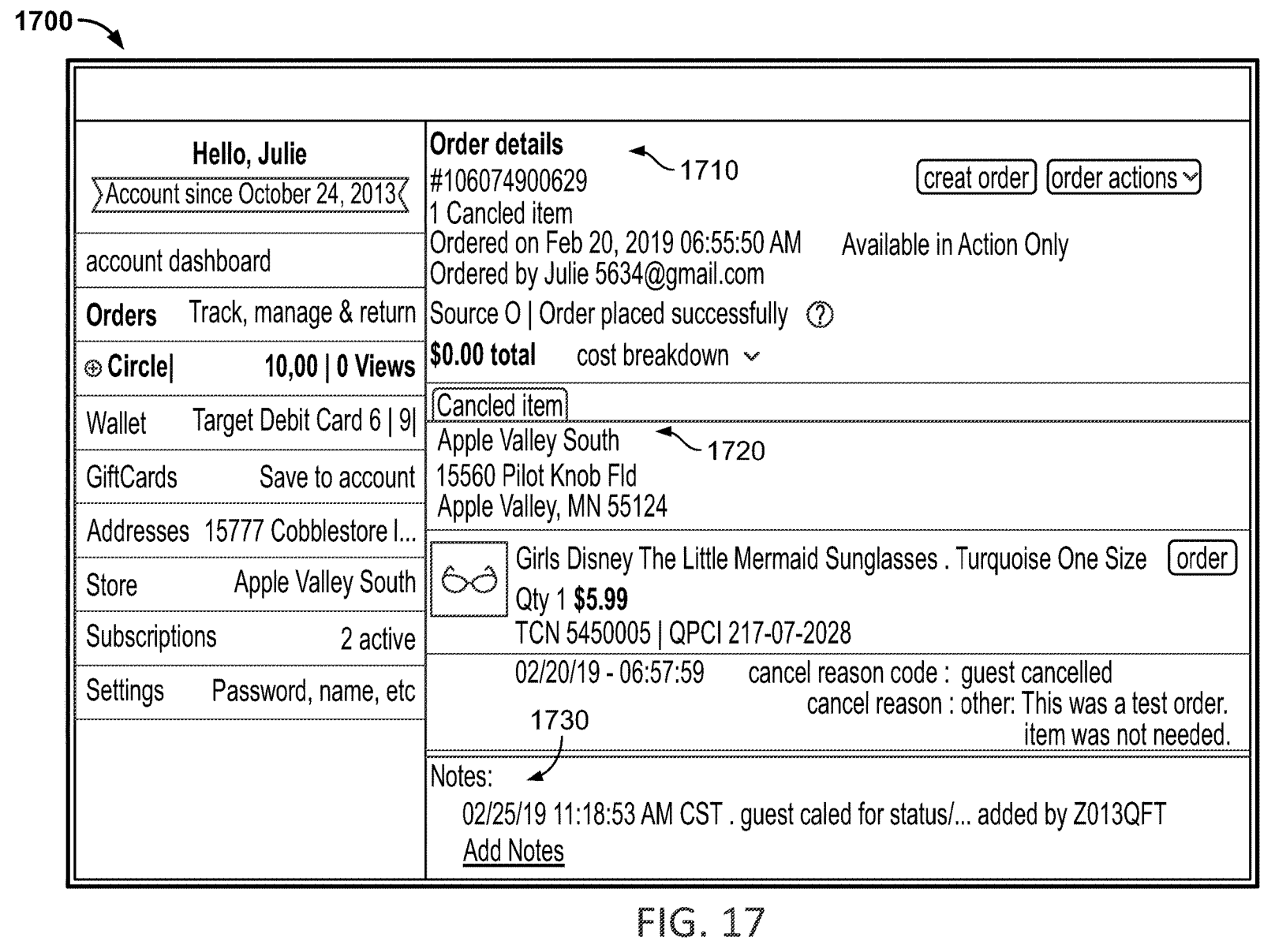

FIG. 17 illustrates an embodiment of the order details page 1700 as seen by the customer service agent on the agent user interface 254. The present embodiment shows only one order within the order details page. If the customer has placed several orders, a list of orders may be presented for the customer service agent to select from. The order details page includes an order summary 1710, detailed description of any changes to the order 1720 and a notes section 1730 that includes any notes or comments written by customer service agents that have assisted the customer with that order. The notes section 1730 also has the option for the current customer service agent to add his/her own notes.

FIG. 18 illustrates an embodiment of the customer service tool showing the customer service agent assisting the customer in adding a discount code 1800. The customer service agent may assist the customer using the customer service tool with not only administrative options not available to the customer, but also with the options available to the customer. Here, the customer has the option to add a discount code to the shopping cart themselves within the customer user interface. However, the customer needed assistance with the task for whatever reason. The customer service agent may navigate to the customer's active shopping cart and add the discount code under the offer codes section 1810 thus assisting the customer with the task. After completing the task of adding the discount code and ensuring that the shopping cart total reflects the discount, the customer service agent may direct the customer to refresh the active shopping cart. Refreshing the active shopping cart automatically causes the active shopping cart to display the customer service agent's changes.

Figure 19:
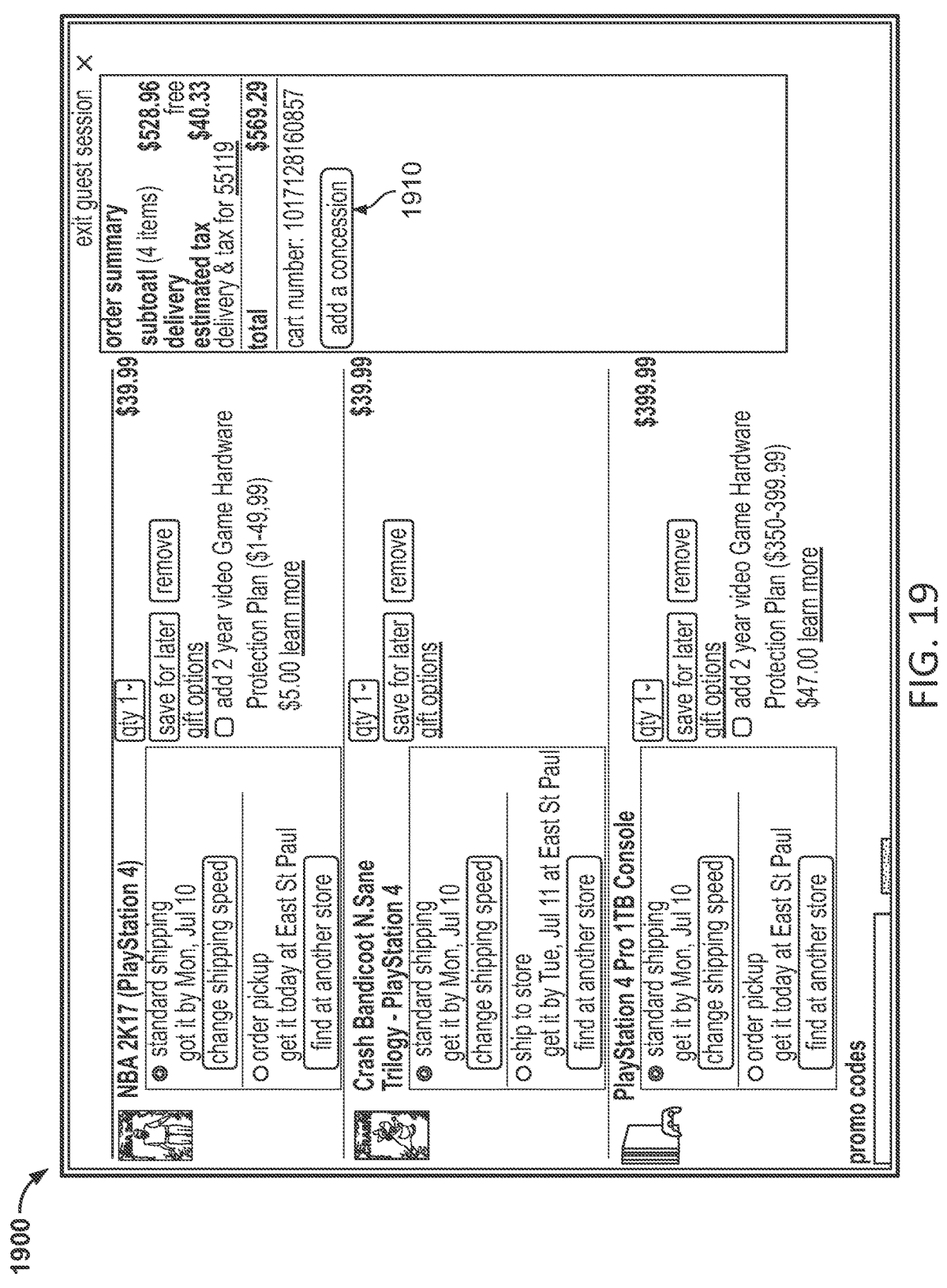

FIG. 19 illustrates an embodiment of the customer account page showing the customer service agent adding a concession to the customer's active shopping cart 1900. The customer service agent may grant the customer a concession or discount by clicking on the "add a concession" button 1910 on the "agent view" of the customer account page, under the customer's active shopping cart and entering in a concession percentage or amount. The "add a concession" button is an example of an administrative option available to the agent, but otherwise unavailable to the customer. Upon refreshing their shopping cart, the customer can automatically see the concession applied to their shopping cart.

Figure 20:
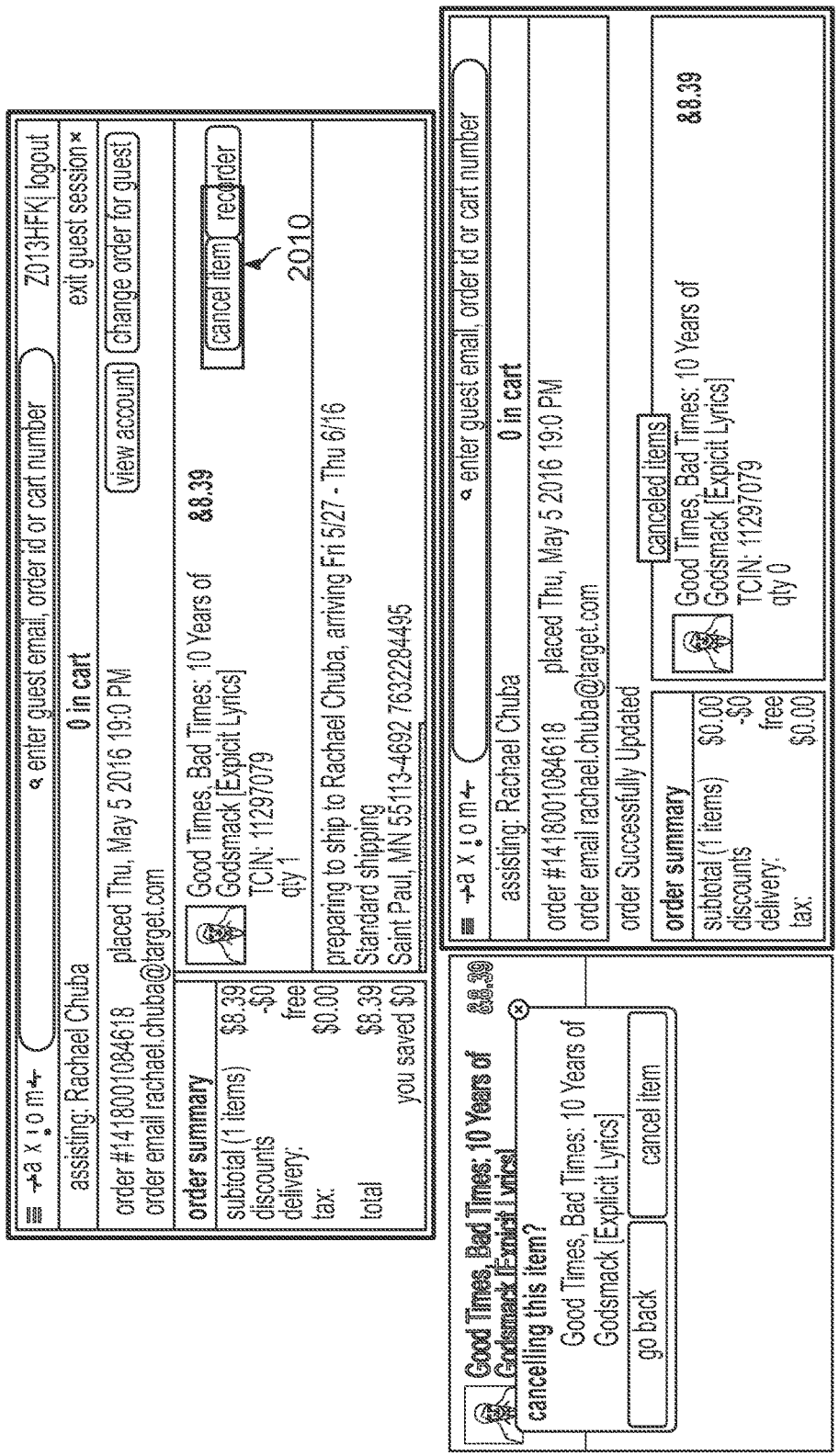
FIG. 20 illustrates an embodiment of the customer account page showing the customer service agent canceling an item from an already placed order.

FIG. 20 illustrates an embodiment of the customer account page showing the customer service agent canceling an item from an already placed order 2000. Usually, customers lack the ability to cancel items from an order that has already been placed. However, if the customer requires assistance in canceling an already placed order or an item within that order, they may contact the customer service agent. The customer service agent may be able to access the customer's orders after finding and opening the customer account page. Under the "agent view" of the customer account, the customer service agent has access to the administrative option to "cancel item" 2010. This option is otherwise unavailable to the customer. By click on this the "cancel item" button, the customer service agent is able to cancel one or more items from the customer's already placed order.

Figure 21:
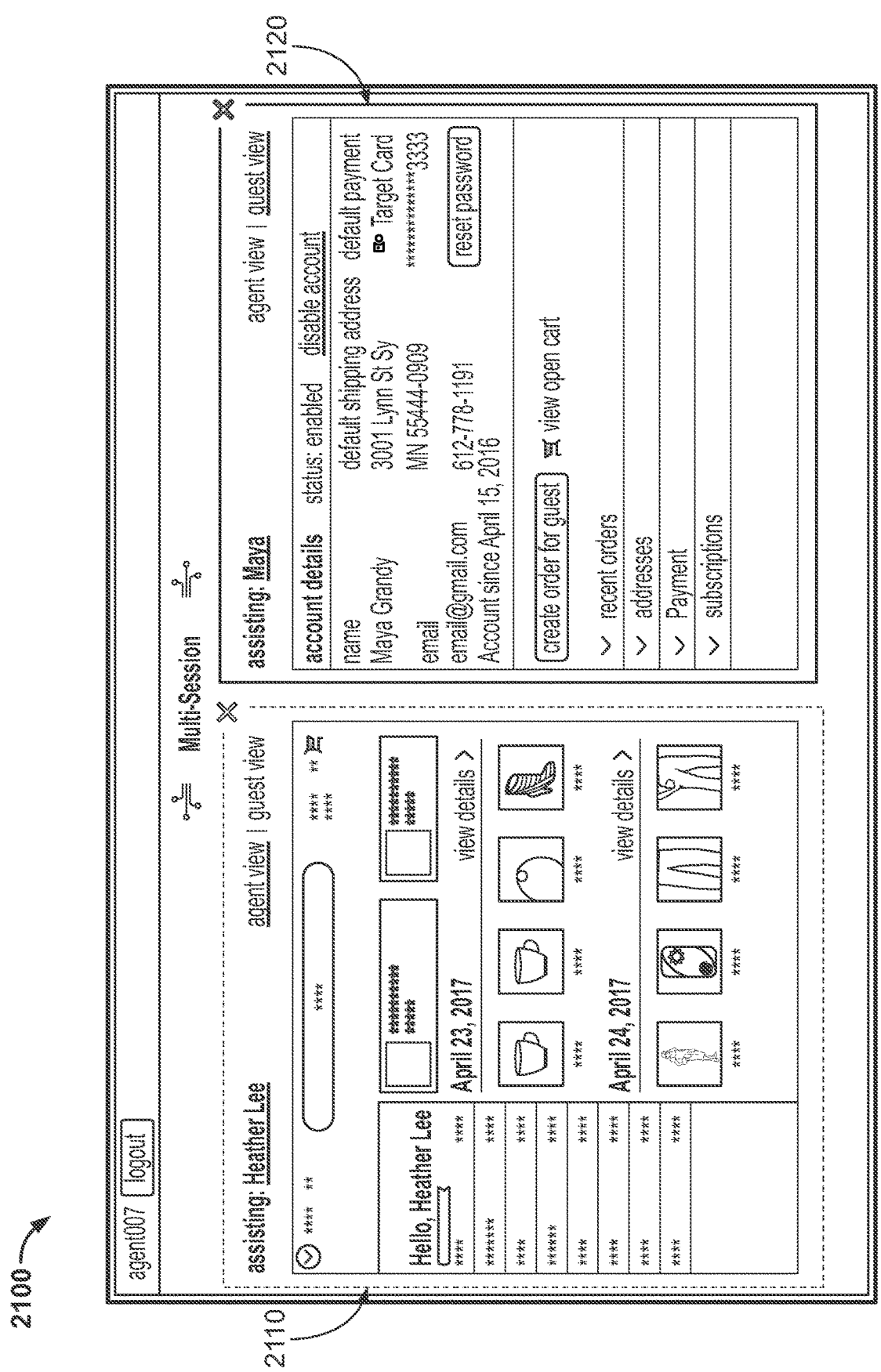
FIG. 21 illustrates an embodiment of the customer service tool that shows multiple sessions in the same agent user interface screen.

FIG. 21 illustrates an embodiment of the customer service tool that shows multiple sessions in the same agent user interface screen 2100. Each session includes a listing of the customer 2110 that the customer service agent is currently helping. The session that the agent is presently actively engaging in is indicated, for example using a red outline around the session display 2120. Each session has all the same options and capabilities as discussed above. The multi-session feature allows for the customer service agent to be efficient and help multiple customers at the same time.

Referring to FIGS. 1-21 generally, it is noted that the customer service tool described herein has a number of advantages with respect to allowing customer service agents to view an exact version of the customer's account, including a customer shopping cart. This avoids any confusion that may be caused by a customer trying to explain the issue encountered with his/her account, and also avoids any issue of a customer service agent being unable to recreate an error which may have occurred within an account—both the user and agent can view a real-time version of that customer account. Still further, the customer service agent has a number of different views of the customer account information, including administrative views which allow various assistance functions to be performed, as well as a customer view in which the customer's view of his/her account screens may be recreated. In both instances, the customer service agent may be granted permissions to modify various aspects of customer account information that may not be available to the customer, so both the customer and the customer service agent can quickly and easily view the effect of changes made by the customer service agent to validate that any issues that were encountered have been successfully resolved.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A system comprising:
one or more processors;
a memory subsystem comprising at least one memory system communicatively connected to the one or more processors, the at least one memory system storing program instructions including a customer service tool, the program instructions being executable by the one or more processors to cause the system to:
responsive to receiving identification data of a plurality of customers and validation information of the customer service agent, generate a user interface presentable at a remote customer service agent device, the user interface including a plurality of session displays presented concurrently within the user interface, each session display of the plurality of session displays associated with a respective one of the plurality of customers, and wherein at least one of the plurality of session displays includes:
a customer account interface including customer account information associated with the respective customer of the plurality of customers and order information associated with an order made by the respective customer, wherein the customer account information is associated with the identification data of the respective customer, the customer account interface having an appearance corresponding to a customer view of the customer account information; and
an administrative option selectable by the customer service agent to cancel the order, wherein the administrative option is unavailable to the respective customer; and
in response to the customer service agent actively engaging with an active session among the plurality of session displays, display a visual indicator within the generated user interface presentable at the remote customer service agent device to indicate that the customer service agent is presently actively engaged with the session display from among the plurality of session displays associated with the active session.

2. The system of claim 1, wherein the customer account interface further includes active shopping cart information associated with the customer.

3. The system of claim 1, wherein the program instructions further cause the system to further include:
receive identification data associated with a customer.

4. The system of claim 3, wherein the identification data associated with the customer includes: an order number, customer email address, customer phone number and customer name.

5. The system of claim 1, wherein the program instructions further cause the system to:
receive identification data associated with the customer service agent; and
upon verifying the received validation information associated with the customer service agent, customize the generated user interface based on the identity of the customer service agent.

6. The system of claim 5, wherein the customization comprises excluding from the user interface at least some administrative options associated with customer payment information.

7. The system of claim 1, wherein the user interface includes a toggle input that allows the customer service agent to select between an agent view and a user view.

8. The system of claim 1, wherein the user interface further includes at least one additional administrative option, the administrative option allowing the customer service agent to perform an action including at least one of:
canceling items from orders;
editing payment information;
editing shipping information;
accessing detailed order status information;
refunding costs; or
waiving fees.

9. A method implemented on one or more processors, the method comprising:
responsive to receiving identification data associated with a plurality of customers and validation information of the customer service agent, generating a user interface presentable at a remote customer service agent device, the user interface including a plurality of session displays presented concurrently within the user interface, each session of the plurality of session displays associated with a respective one of the plurality of customers, and wherein at least one of the plurality of session displays includes:
a first graphical representation of an active shopping cart of the respective customer of the plurality of customers, the active shopping cart being associated with the identification data of the respective customer, and the first graphical representation having an appearance corresponding to a customer view of the active shopping cart; and
at least one administrative option selectable by the customer service agent to execute a function affecting the active shopping cart of the customer, wherein the at least one administrative option is unavailable to the respective customer; and
in response to the customer service agent actively engaging with an active session among the plurality of session displays, displaying a visual indicator within the generated user interface presentable at the remote customer service agent device to indicate that the customer service agent is presently actively engaged with the session display from among the plurality of session displays associated with the active session.

10. The method implemented on the one or more processors of claim 9, further comprising:
receiving an instruction to select and perform a function affecting the active shopping cart of the customer in response to receipt of user input from the customer service agent at the user interface; and
executing the instruction, thereby affecting the active shopping cart of the customer.

11. The method implemented on the one or more processors of claim 9, wherein a second graphical representation of the active shopping cart of the customer associated with the customer is also generated from the shopping cart data.

12. The method implemented on the one or more processors of claim 11, wherein the identification data associated with the customer includes: a cart number, the customer email address, the customer phone number and the customer name.

13. The method implemented on the one or more processors of claim 9, wherein the at least one administrative option includes:
an option to apply a discount; and
an option to waive at least a portion of fees.

14. The method implemented on the one or more processors of claim 9, further comprising, upon verifying the received validation data of the customer service agent, customizing the generated user interface based on the identity of the customer service agent,
wherein the customization comprises excluding from the user interface at least some administrative options associated with customer payment information.

15. The method implemented on the one or more processors of claim 9, wherein the user interface includes a toggle input that allows the customer service agent to select between an agent view and a user view.

16. A method implemented on one or more processors, the method comprising:
in response to receiving identification data associated with a plurality of customers, providing a user interface to a customer service agent, the user interface including a plurality of session displays presented concurrently within the user interface, each session of the plurality of session displays associated with a respective one of the plurality of customers, and wherein at least one of the plurality of session displays includes:
a customer account interface including customer account information associated with the respective customer of the plurality of customers and order information associated with an order made by the respective customer, wherein the customer account information is associated with the identification data of the respective customer, the customer account interface having an appearance corresponding to a customer view of the customer account information; and
an administrative option selectable by the customer service agent to cancel the order, wherein the administrative option is unavailable to the respective customer; and
in response to the customer service agent actively engaging with an active session among the plurality of session displays, displaying a visual indicator within the generated user interface presentable at the remote customer service agent device to indicate that the customer service agent is presently actively engaged with the session display from among the plurality of session displays associated with the active session.

17. The method implemented on the one or more processors of claim 16, wherein the customer account interface further includes active shopping cart information associated with the customer.

18. The method implemented on the one or more processors of claim 17, further comprising receiving identification data associated with the customer, wherein the identification data associated with the customer includes: an order number, customer email address, customer phone number and customer name.

19. The method implemented on the one or more processors of claim 16, further comprising:
receiving identification data associated with the customer service agent; and
upon verifying the received identification data associated with the customer service agent, customizing the generated user interface based on the identity of the customer service agent.

20. The method implemented on the one or more processors of claim 16, wherein the user interface further includes at least one additional administrative option, the administrative option allowing the customer service agent to perform an action including at least one of:
canceling items from orders;
editing payment information;
editing shipping information;
accessing detailed order status information;
refunding costs; or
waiving fees.

* * * * *